(12) United States Patent
Wang et al.

(10) Patent No.: US 12,287,000 B1
(45) Date of Patent: Apr. 29, 2025

(54) LOCKING AND POSITIONING MECHANISM AND ROTATIONAL FOLDING POSITIONING APPARATUS

(71) Applicant: Apraseodymium (Changzhou) Intelligent Technology Co., LTD, Changzhou (CN)

(72) Inventors: Zhen Wang, Changzhou (CN); Meng Ji, Changzhou (CN); Xinli Lv, Changzhou (CN)

(73) Assignee: Apraseodymium (Changzhou) Intelligent Technology Co., LTD, Changzhou (CN)

( * ) Notice: Subject to any disclaimer, the term of this patent is extended or adjusted under 35 U.S.C. 154(b) by 0 days.

(21) Appl. No.: 19/002,278

(22) Filed: Dec. 26, 2024

(30) Foreign Application Priority Data

Feb. 21, 2024 (CN) .......................... 202410193105.7

(51) Int. Cl.
*F16B 7/18* (2006.01)
*F16B 7/04* (2006.01)

(52) U.S. Cl.
CPC .............. *F16B 7/18* (2013.01); *F16B 7/044* (2013.01)

(58) Field of Classification Search
CPC ........ F16B 7/04; F16B 7/0406; F16B 7/0413; F16B 7/042; F16B 21/12; F16B 21/125; F16B 21/14; F16B 21/16
USPC ............ 403/83, 84, 103, 104, 106, 107, 108
See application file for complete search history.

(56) References Cited

U.S. PATENT DOCUMENTS

| | | | | |
|---|---|---|---|---|
| 5,028,161 A | * | 7/1991 | Peleg | F16B 7/04 403/236 |
| 6,923,484 B2 | * | 8/2005 | Braun | F16B 7/042 293/133 |
| 6,951,327 B1 | * | 10/2005 | Seo | F16B 7/0446 248/188 |
| 10,080,696 B2 | * | 9/2018 | Oginski | A61G 13/107 |
| 10,323,791 B1 | * | 6/2019 | Liu | F16B 2/065 |
| 10,376,042 B1 | * | 8/2019 | Johnson | F16M 11/06 |
| 11,644,148 B2 | * | 5/2023 | Follis | F16M 13/022 248/220.22 |

(Continued)

FOREIGN PATENT DOCUMENTS

| | | | | |
|---|---|---|---|---|
| AT | | 322814 B | * | 6/1975 |
| AT | | 15684 U1 | * | 4/2018 |

(Continued)

*Primary Examiner* — Jonathan P Masinick
(74) *Attorney, Agent, or Firm* — Nitin Kaushik

(57) ABSTRACT

The present disclosure relates to a locking and positioning mechanism and a rotational folding positioning apparatus. The locking and positioning mechanism includes a locking knob and a positioning pin. The locking knob is in a threaded connection with a side wall of a support sleeve, and the support sleeve sleeves a stand column; the locking knob can be screwed in and out relative to the support sleeve, and when the locking knob is screwed inward, an inner end of the locking knob presses tightly against the stand column for locking. The positioning pin is coaxially arranged through the locking knob, and the positioning pin can extend inward and outward relative to the locking knob; an elastic member is provided between the positioning pin and the locking knob. The mechanism is compact in structure, occupies minimal space, and is convenient and effortless to operate.

2 Claims, 27 Drawing Sheets

(56) References Cited

U.S. PATENT DOCUMENTS

| | | | |
|---|---|---|---|
| 12,072,060 B2 * | 8/2024 | Chen | F16M 13/022 |
| 12,158,169 B2 * | 12/2024 | Ishikawa | B23B 31/204 |
| 2015/0050077 A1 * | 2/2015 | Huang | F16M 11/2064 |
| | | | 403/327 |

FOREIGN PATENT DOCUMENTS

| | | | | |
|---|---|---|---|---|
| CA | 2516534 A1 * | 3/2007 | | A45B 3/00 |
| CH | 131649 A * | 2/1929 | | |
| CH | 397166 A * | 8/1965 | | |
| CN | 202673121 U | 1/2013 | | |
| CN | 210799718 U | 6/2020 | | |
| CN | 113357243 A | 9/2021 | | |
| FR | 666189 A * | 9/1929 | | |
| FR | 960802 A * | 4/1950 | | |
| FR | 2697299 A1 * | 4/1994 | | B63H 9/1028 |
| GB | 1165055 A * | 9/1969 | | |
| GB | 1328046 A * | 8/1973 | | |
| GB | 2205351 A * | 12/1988 | | A01K 97/22 |
| KR | 20110004314 U * | 5/2011 | | |
| KR | 101130227 B1 * | 3/2012 | | |

* cited by examiner

LOCKING AND POSITIONING MECHANISM AND ROTATIONAL FOLDING POSITIONING APPARATUS

CROSS-REFERENCE TO RELATED APPLICATIONS

The application claims priority to Chinese patent application No. 202410193105.7, filed on Feb. 21, 2024, the entire contents of which are incorporated herein by reference.

TECHNICAL FIELD

The present disclosure relates to the technical field of locking and positioning, in particular to a locking and positioning mechanism and a rotational folding positioning apparatus.

BACKGROUND

In the prior art, when vertically adjusting and positioning a sliding member that slidably sleeves a vertical support, a plurality of pin holes are typically formed on the vertical support. A fastening pin is in a threaded connection with the sliding member. When the sliding member slides to a set height, the fastening pin is screwed into the pin hole corresponding to the current height, thus achieving the positioning of the sliding member at the current height. However, this structure cannot adjust the tightness between the sliding member and the vertical support, which may cause the sliding member to wobble. If a locking structure is added to the sliding member, it would occupy a significant amount of space and could even affect the layout of other structures.

SUMMARY

To address the technical issue in the prior art where the simultaneous arrangement of positioning and locking structures on the sliding member of a vertical support leads to large space occupation and unfavorable layout, the present disclosure provides a locking and positioning mechanism that can achieve the positioning and locking of a support sleeve on a stand column. The mechanism is compact in structure, occupies minimal space, and is convenient and effortless to operate.

The technical solutions of the present disclosure are as follows.

Provided is a locking and positioning mechanism. The locking and positioning mechanism includes:
  a locking knob, wherein the locking knob is in a threaded connection with a side wall of a support sleeve, and the support sleeve sleeves a stand column; the locking knob can be screwed in and out relative to the support sleeve, and when the locking knob is screwed inward, an inner end of the locking knob presses tightly against the stand column for locking; and
  a positioning pin, wherein the positioning pin is coaxially arranged through the locking knob, and the positioning pin can extend inward and outward relative to the locking knob; an elastic member is provided between the positioning pin and the locking knob, and when the positioning pin extends inward under an action of the elastic member, an inner end of the positioning pin cooperates with a positioning hole formed on the stand column for positioning.

Further, a protective pad is further provided between the locking knob and the stand column, and a via hole is formed on the protective pad for the inner end of the positioning pin to pass through; the protective pad includes a flat pad part and a connecting post, wherein the flat pad part is compressed between the locking knob and the stand column, the connecting post is perpendicular to the flat pad part, the connecting post is inserted into a connecting cavity formed at the inner end of the locking knob, and an outer side wall of the connecting post is flexibly connected to an inner side wall of the connecting cavity by an O-ring.

Further, a plane bearing further sleeves the connecting post of the protective pad, and the plane bearing is compressed between the flat pad part of the protective pad and the inner end of the locking knob.

Further, a threaded seat is perpendicularly provided on a side wall of the support sleeve, and the locking knob is in a threaded connection with the threaded seat; a retaining member is further provided at an outer end of the threaded seat to prevent the locking knob from slipping out.

Further, a flange is formed in a middle part of the positioning pin, the flange is confined to move within the connecting cavity, and the elastic member is arranged between the flange and a bottom surface of the connecting cavity; one end of the positioning pin passes inward through the support sleeve, and the other end extends outward from the locking knob to form an operating part; pressing plates are further arranged oppositely on both sides of the stand column, with one of the pressing plates being arranged between the stand column and the protective pad, and a via hole being formed on the pressing plate for the positioning pin to pass through.

In another aspect of the present disclosure, a rotational folding positioning apparatus is provided. The rotational folding positioning apparatus includes the locking and positioning mechanism as described in any one of the above contents.

Further, the stand column is a square tube, the locking knob and the positioning pin are arranged on a right side of the stand column, and a plurality of the positioning holes are vertically formed on a right side surface of the stand column; protective strips are respectively provided vertically on a front side surface and a rear side surface of the stand column, and rollers are provided correspondingly on the support sleeve; a rotational sleeve further sleeves the support sleeve, the rotational sleeve is connected to an arm, and the rotational sleeve drives the arm to rotate horizontally relative to the support sleeve; a horizontal rotation adjustment mechanism that adjusts a horizontal rotation angle of the arm is provided on a left side of the stand column.

Further, the horizontal rotation adjustment mechanism includes a clamping block, and the clamping block is vertically and elastically arranged on the support sleeve; a protruding edge is inwardly formed at an end of the rotational sleeve, and a plurality of clamping slots are formed on the protruding edge; after a lateral adjustment of the rotational sleeve is completed, the clamping block engages with a currently corresponding clamping slot to limit the rotational sleeve from horizontal rotation.

Optionally, a vertical swing adjustment mechanism is further provided between the arm and the rotational sleeve; the rotational sleeve is provided with a hinge seat, and the arm is hinged to the hinge seat; a plurality of locking grooves, arranged circumferentially and centered on a hinge shaft, are further formed on the hinge seat; a locking member is provided on the arm, and the locking member extends and retracts along a direction parallel to the hinge shaft to cooperate with the locking grooves for locking; a fixed seat is provided within the arm, and a through hole is formed on the fixed seat for the locking member to extend and retract; a lock cylinder is provided within the fixed seat, and a recessed part is formed on the lock cylinder; the lock cylinder slides along a length direction of the arm; when the lock cylinder slides towards the hinge shaft, the recessed part is offset from the through hole and forces the locking member to simultaneously extend into the through hole and the locking groove for locking; when the lock cylinder slides away from the hinge shaft, the recessed part aligns with the through hole, allowing the locking member to disengage from the locking groove, thus releasing the lock.

Optionally, a vertical swing adjustment mechanism is further provided between the arm and the rotational sleeve; the rotational sleeve is provided with a hinge seat, and the arm is hinged to the hinge seat; a plurality of lock teeth, arranged circumferentially and centered on a hinge shaft, are further formed on the hinge seat; a moving seat is provided within the arm, and the moving seat slides towards or away from the hinge shaft; a lock groove is formed on one end, facing the hinge shaft, of the moving seat, and the moving seat causes the lock groove to engage with one of the lock teeth under an action of a compressed spring; the moving seat is further provided with a locking piece that elastically extends and retracts perpendicularly to a sliding direction of the moving seat; a locking slot is correspondingly formed on the arm, and the locking piece, when extending into the locking slot, locks the moving seat and the arm.

After adopting the above technical solutions, the locking and positioning mechanism and the rotational folding positioning apparatus provided according to the present disclosure, compared to the prior art, have the following beneficial effects: The locking and positioning mechanism provided according to the present disclosure not only allows for the positioning of the support sleeve but also allows for the locking of the support sleeve after positioning. Moreover, by arranging and integrating the positioning pin for positioning within the locking knob, an integrated structure is formed, reducing space occupancy and facilitating the layout of other components. Furthermore, in the embodiments, an elastic member is arranged between the positioning pin and the locking knob to provide a resetting force to the positioning pin, making the operation during positioning more convenient.

Figure 1:
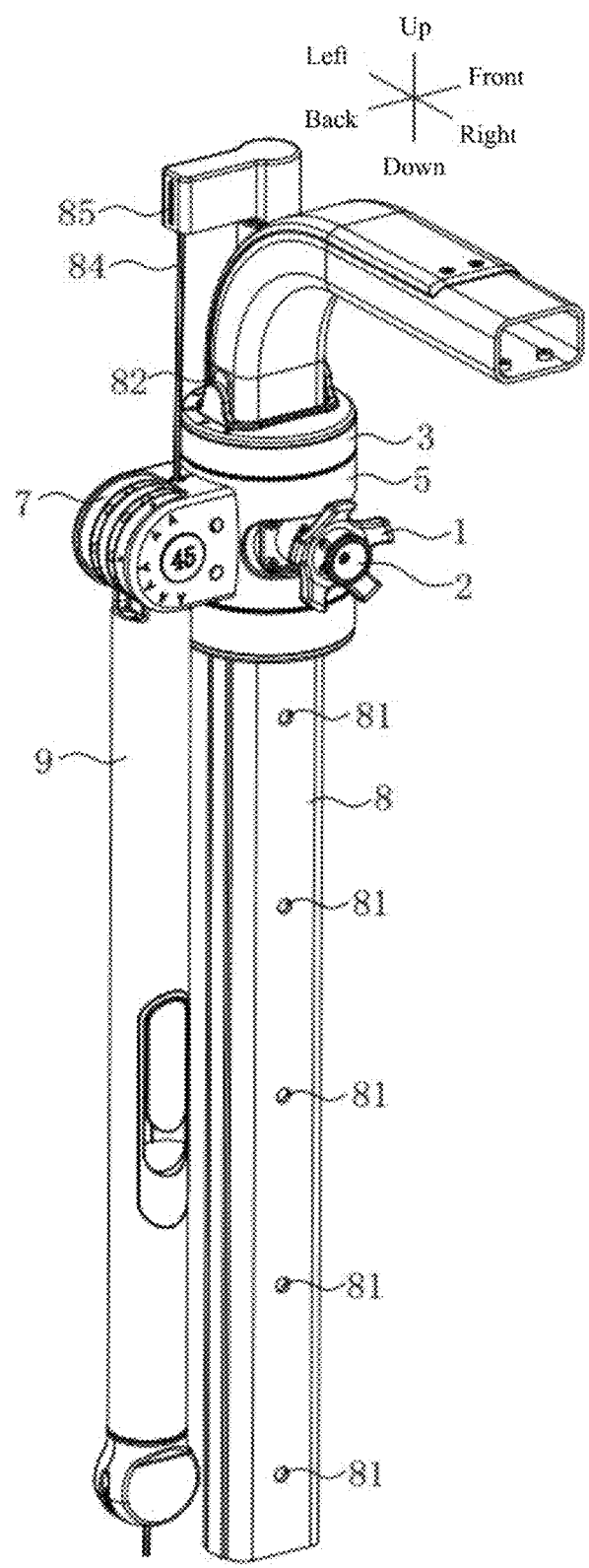
FIG. 1 is a schematic structural diagram of a rotational folding positioning apparatus from a first perspective according to the present disclosure.

Locking Knob 1; Connecting Cavity 11; Protective Pad 12; Flat Pad Part 121; Connecting Post 122; O-ring 123; Plane Bearing 13; Pressing Plate 14; Limiting Edge 141; Via Hole 15; Positioning Pin 2; Flange 21; Elastic Member 22;

Support Sleeve 3; Threaded Seat 31; Retaining Member 311; Limiting Surface 32; Rotational Installation Part 33; First Radial Protruding Part 34; Second Radial Protruding Part 35; Bushing 36; Groove 361; Annular Washer 37;

Roller 4; Rolling Part 41; Limiting Part 42;

Rotational Sleeve 5; Protruding Edge 51; Clamping Slot 511; Long Slot 52;

Clamping Block 6; Sliding Seat 61; Sliding Groove 62; Sliding Strip 63; Spring 64; Pressing Rod 65; Pressuring Step 651; Retaining Nut 66;

Hinge Seat 7; Hinge Shaft 71; Locking Groove 72; Lock Plate 73; Intermediate Pulley 74; Arc-shaped Guide Slot 75; Lock Teeth 76;

Stand Column 8; Positioning Hole 81; Protective Strip 82; Snap 821; Snap Hole 83; Pull Rope 84; Follower Pulley 85;

Arm 9; Locking Member 91; Notched Cylindrical Groove 911; Roller Pin 912; Connecting Shaft 913; Circlip 914; Limiting Plate 915; Fixed Seat 92; Through Hole 921; Lock Cylinder 922; Recessed Part 9221; Conical Surface 9222; Radial Protrusion 9223; Compressed Spring 923; End Seat 924; Pull Rod 925; Connecting Seat 93; Guide Post 931; Ball 932; Locking Slot 933; Operating Member 941; Operating End 942; Installation Seat 943; Resetting Member 944; Lock Groove 95; Moving Seat 96; Retractable Slot 961; Receiving Groove 962; Compression Spring 963; Locking Piece 964; Bearing Groove 9641; Operating Rod 97; Bearing Step 971; Retaining Screw 972; Seat Body 98; Movement Slot 99.

DETAILED DESCRIPTION OF THE EMBODIMENTS

The technical solutions in the embodiments of the present disclosure will be clearly and completely described below with reference to the drawings in the embodiments of the present disclosure, and it is obvious that the described embodiments are only a part of the embodiments of the present disclosure but not all of them. The following description of at least one exemplary embodiment is merely illustrative in nature and is in no way intended to limit the present disclosure, application thereof, or use thereof. Based on the embodiments of the present disclosure, all other embodiments obtained by those of ordinary skills in the art without creative efforts shall fall within the protection scope of the present disclosure.

In the description of the present disclosure, it should be understood that directional or positional relationships indicated by directional terms such as "front, back, up, down, left, right", "horizontal, vertical, perpendicular, level", and "top, bottom" are generally based on the directional or positional relationships shown in the drawings. These terms are merely intended to facilitate the description of the present disclosure and simplify the explanation. Unless otherwise specified, these directional terms do not indicate or imply that the referenced apparatuses or elements must have specific directions or be constructed and operated in a particular direction, and therefore should not be construed as limiting the scope of the present disclosure. The directional terms "inner" and "outer" refer to the inside and outside relative to the contour of each component itself.

In multi-functional integrated fitness devices, to perform exercises involving various postures and functions, such as flyes, woodchops, and push-pull movements, the arms need to be adjustable. This includes adjustments such as vertical height adjustment, horizontal rotation adjustment, and vertical swing adjustment. When the arms are adjusted to different angles and positions, exercises involving different postures and functions can be performed. During exercise, the user pulls the pull ring at the end of the arm, and the pull ring drives one end of the pull rope inside the arm to move. The other end of the pull rope is connected to a load such as a weight or a motor.

The invention patent with Application No. "202310152103.9" titled "ROTATIONAL FOLDING POSITIONING APPARATUS FOR FUNCTION EXPANSION" discloses a rotational folding positioning apparatus that can be used in multi-functional fitness devices. The rotational folding positioning apparatus includes a vertical support and a rotating sleeve assembly sleeving the vertical support. The rotating sleeve assembly is provided with a fastening pin, and a plurality of pin holes are formed on the vertical support. The fastening pin can be inserted into one of the pin holes to position the rotating sleeve assembly at a set height. However, when the rotating sleeve assembly is moved to the set height, it is not possible to adjust the tightness between the rotating sleeve assembly and the vertical support, which may cause the rotating sleeve assembly to wobble. Additionally, adding a locking structure to the rotating sleeve assembly would occupy a significant amount of space and affect the layout of other components.

The main objective of the present disclosure is to provide a rotational folding positioning apparatus that can be applied to a fitness device and other devices. The apparatus allows for the positioning and locking of the arm after vertical height and linear movement adjustment, while maintaining a compact structure and occupying minimal space. Furthermore, the apparatus enables locking and unlocking during horizontal rotation and vertical swing folding adjustments, allowing for locking before and after adjustment and unlocking when adjustment is needed. Specific embodiments will be described in detail below.

Embodiment I

As shown in FIGS. 1 to 11, the embodiment provides a locking and positioning mechanism that allows the arm 9 to be locked and positioned on the stand column 8 before and after vertical height adjustment. Specifically, the stand column 8 is a cylinder for supporting and installation, and a support sleeve 3 may slidably sleeve the stand column 8. The arm 9 is arranged on the support sleeve 3, allowing the arm 9 to slide vertically with the support sleeve 3.

The locking and positioning mechanism includes a locking knob 1 and a positioning pin 2. The locking knob 1 is in a threaded connection with the side wall of the support sleeve 3. The locking knob 1 can be, relative to the support sleeve 3, screwed inward towards the stand column 8 or outward away from the stand column 8. When the locking knob 1 is screwed inward, the inner end thereof can press tightly against the stand column 8, creating a clamping force between the stand column 8 and the support sleeve 3, thereby locking the support sleeve 3 in place. The positioning pin 2 is coaxially arranged through the locking knob 1, that is, the middle part of the locking knob 1 is penetrated to form a cavity. The positioning pin 2 can pass through the cavity and extend inward towards the stand column 8 or outward away from the stand column 8 within the locking knob 1. An elastic member 22 is provided between the locking knob 1 and the positioning pin 2, and the elastic member 22 may be, but is not limited to, a compressed spring. The elastic member 22 may be arranged either inside or outside the locking knob 1, providing inward an initial force on the positioning pin 2. The initial force allows the inner end of the positioning pin 2 to insert into one of the positioning holes 81 formed on the stand column 8 for positioning.

In the initial state, the support sleeve 3 is locked and positioned at a set height. When it is necessary to adjust the height of the support sleeve 3, the locking knob 1 is firstly rotated outward to retreat and release the lock on the support sleeve 3. Then, the positioning pin 2 is pulled outward, allowing the inner end of the positioning pin 2 to exit the current positioning hole 81; at this point, the support sleeve 3 can be adjusted vertically. Once the support sleeve 3 is adjusted to the desired height position, the positioning pin 2 is released. Under the action of the elastic member 22, the inner end of the positioning pin 2 extends into a new positioning hole 81 for positioning; subsequently, the locking knob 1 is rotated in the opposite direction to move it inward for locking.

Thus, the locking and positioning mechanism provided in the embodiment not only allows for the positioning of the support sleeve 3 but also allows for the locking of the support sleeve 3 after positioning. Moreover, by arranging and integrating the positioning pin 2 for positioning within the locking knob 1, an integrated structure is formed, reducing space occupancy and facilitating the layout of other components. Furthermore, in the embodiment, an elastic member 22 is arranged between the positioning pin 2 and the locking knob 1 to provide a resetting force to the positioning pin 2, making the operation during positioning more convenient.

Figure 5:
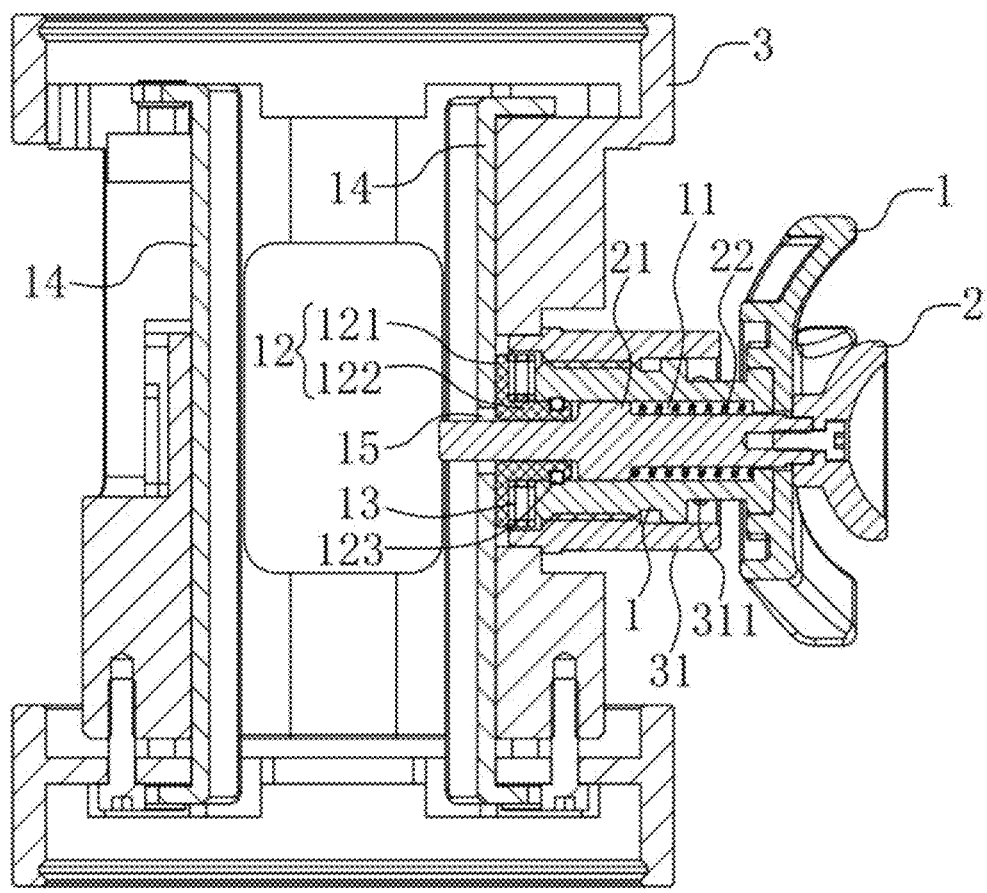
FIG. 5 is a cross-sectional view of a locking knob and a support sleeve according to the present disclosure.
Figure 6:
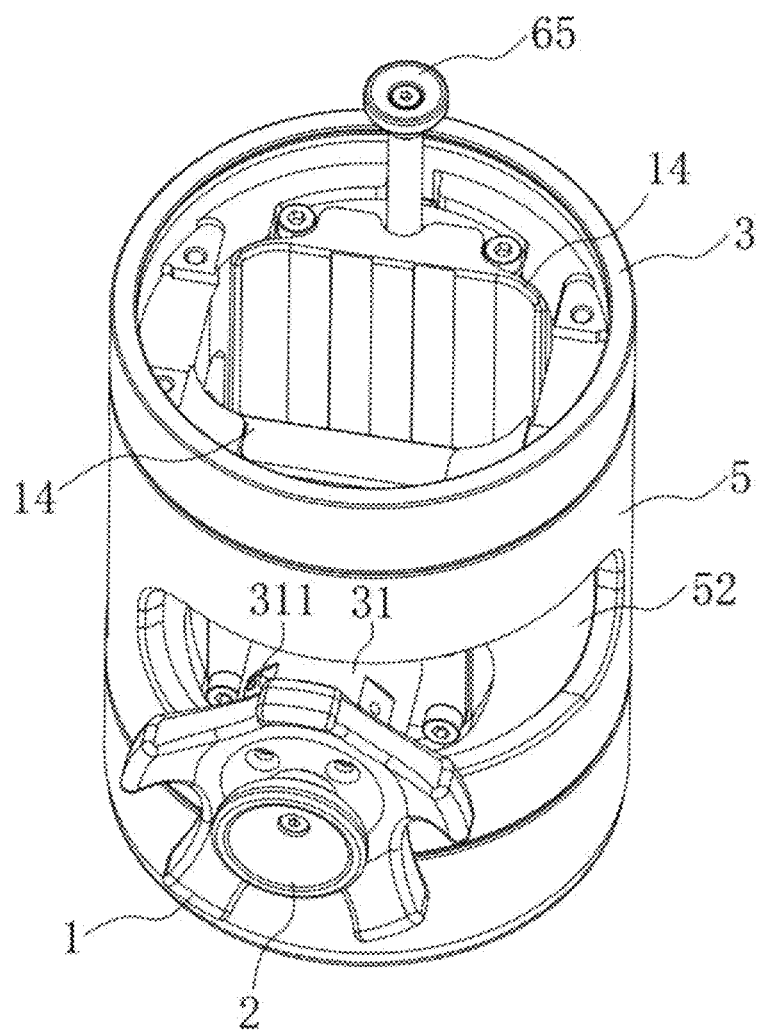
FIG. 6 is a schematic structural diagram of a support sleeve and a rotational sleeve according to the present disclosure.

Since the inner end of the locking knob 1 acts on the stand column 8, it would cause wear on the stand column 8. To address this, as shown in FIG. 5, in the embodiment, a protective pad 12 is further provided between the locking knob 1 and the stand column 8. By arranging the protective pad 12, the wear on the stand column 8 can be reduced when the locking knob 1 is rotated. Additionally, a via hole 15 needs to be formed on the protective pad 12 to allow the inner end of the positioning pin 2 to pass through, ensuring that the normal function of the positioning pin 2 is not affected.

The protective pad 12 may be annular with a via hole formed in the middle part. Alternatively, as a more preferred solution, in the embodiment, the protective pad 12 includes a flat pad part 121 and a connecting post 122. The flat pad part 121 is annular and is compressed between the locking knob 1 and the stand column 8, and the outer diameter of the flat pad part 121 is preferably greater than or equal to the outer diameter of the inner end of the locking knob 1. The connecting post 122 is perpendicular to the flat pad part 121 and is arranged towards the locking knob 1. The inner end of the locking knob 1 is recessed inward to form a connecting cavity 11, the connecting post 122 is inserted into the connecting cavity 11, and the outer side wall of the connecting post 122 is flexibly connected to the inner side wall of the connecting cavity 11 by an O-ring 123. For example, installation grooves are correspondingly formed on the outer side wall of the connecting post 122 and the inner side wall of the connecting cavity 11, with the O-ring 123 arranged in the installation grooves. The O-ring 123 is a rubber ring shaped like an "O". The arrangement of the connecting post 122 can ensure the coaxiality of the protective pad 12 with the locking knob 1. Furthermore, the arrangement of the O-ring 123 can pre-connect the protective pad 12 and the locking knob 1 as a unit, facilitating installation. Moreover, the arrangement can ensure that during subsequent locking and unlocking, the locking knob 1 can rotate relative to the connecting post 122, thereby reducing wear on the stand column 8.

During use, it has been found that the rotational force required to lock and unlock the locking knob 1 is relatively large, which is not user-friendly for those with less strength. To address this, in the embodiment, a plane bearing 13 further sleeves the connecting post 122 of the protective pad 12. The plane bearing 13 is compressed between the flat pad part 121 of the protective pad 12 and the inner end of the locking knob 1, and the outer diameter of the plane bearing 13 is preferably greater than or equal to the outer diameter of the inner end of the locking knob 1 and less than or equal to the outer diameter of the flat pad part 121 of the protective pad 12. The plane bearing 13 consists of a cage with a spherical or cylindrical rolling element and a flat gasket. Through the rolling of the rolling element within the plane bearing 13, the rotational force required for the operation of locking and unlocking the locking knob 1 is reduced, which makes the usage more convenient and the operation more user-friendly for users with less strength.

As shown in FIG. 5, the middle part of the positioning pin 2 radially protrudes to form a flange 21, and the flange 21 is confined to move within the connecting cavity 11. The elastic member 22 is arranged between the flange 21 and the bottom surface within the connecting cavity 11, and the elastic member 22 is a pressuring spring, which applies an initial force to one side of the flange 21; the other side of the flange 21 abuts against the connecting post 122 of the protective pad 12. One end of the positioning pin 2, i.e., the inner end thereof, passes inward through the support sleeve 3 and the protective pad 12, and the other end, i.e., the outer end thereof, extends outward from the locking knob 1 to form an operating part. The shape of the operating part may be designed as needed to facilitate pulling.

In the embodiment, a threaded seat 31 is further perpendicularly provided on the side wall of the support sleeve 3, and the locking knob 1 is in a threaded connection with the threaded seat 31. A retaining member 311 is provided at the outer end of the threaded seat 31 to prevent the locking knob 1 from rotating out, and the retaining member 311 may be, but is not limited to, a retaining screw connected to the threaded seat 31.

Figure 3:
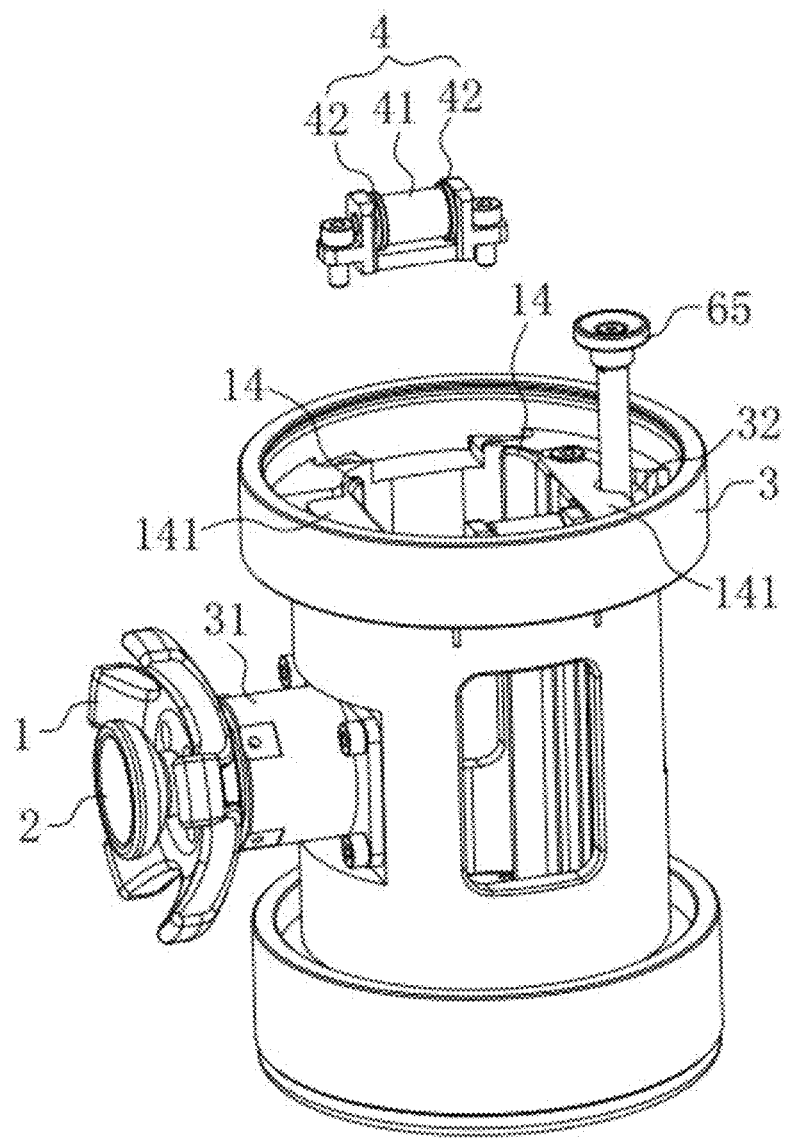
FIG. 3 is a schematic structural diagram of a roller according to the present disclosure.
Figure 4:
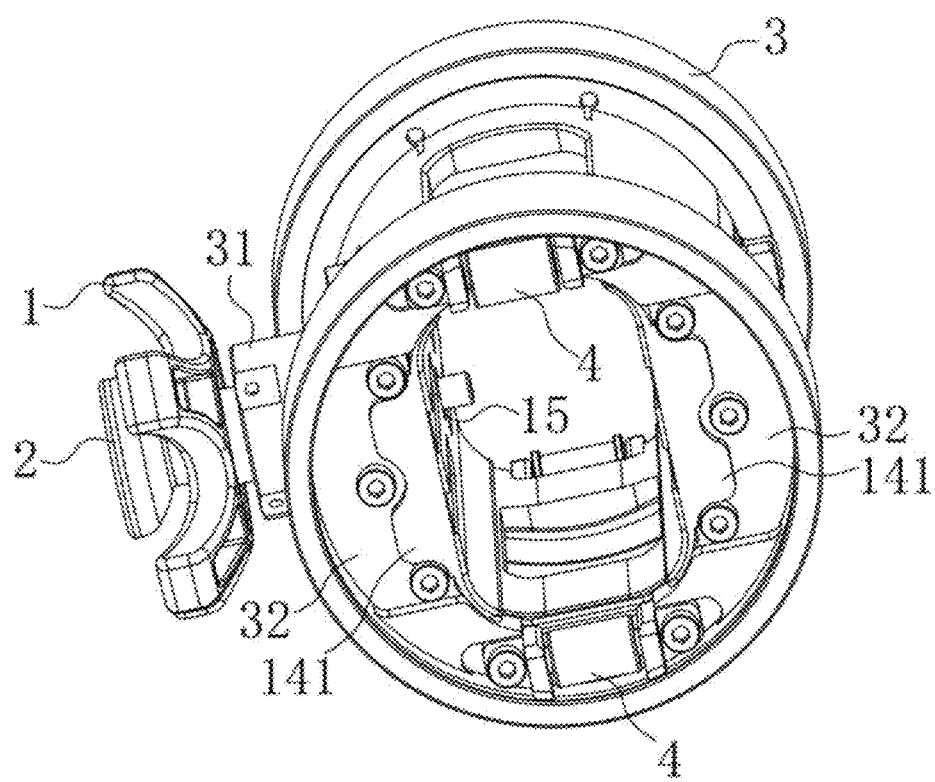
FIG. 4 is a schematic structural diagram of a locking knob and a support sleeve according to the present disclosure.

Furthermore, in the embodiment, pressing plates 14 are further arranged oppositely on both sides of the stand column 8. One of the pressing plates 14 is arranged between the stand column 8 and the protective pad 12, and a via hole 15 is formed on the pressing plate for the positioning pin 2 to pass through; the other pressing plate 14 is arranged on the opposite side and located between the support sleeve 3 and the stand column 8. The pressing plates 14 are preferably made of non-metallic materials such as plastic or rubber, which allow for better compression. The pressing plates 14 are preferably shaped to match the profile of the stand column 8, such that the two pressing plates 14 can cooperate to embrace the stand column 8. As shown in FIGS. 3 to 4, in the embodiment, limiting edges 141 are further provided at both the upper and lower ends of the pressing plates 14. The limiting edges 141 cooperate with corresponding limiting surfaces 32 on the support sleeve 3 to prevent the pressing plates 14 from slipping out and to enable the pressing plates 14 to move vertically together with the support sleeve 3.

From the above content, it is clear that the locking and positioning mechanism provided according to the embodiment can achieve the positioning and locking of the support sleeve on the stand column. The mechanism is compact in structure, occupies minimal space, and is convenient and effortless to operate.

Embodiment II

The embodiment provides a rotational folding positioning apparatus that adopts the locking and positioning mechanism described in Embodiment I, such that the arm assembly can slide vertically along the stand column 8 for adjustment and can be positioned and locked after adjustment.

As shown in FIGS. 1 to 11, in the embodiment, the stand column 8 is a square tube, and the four corners of the square tube may be chamfered corners. The locking knob 1 and the positioning pin 2 are arranged on the right side of the stand column 8, and a plurality of positioning holes 81 are vertically formed on the right side surface of the stand column 8. The number and spacing of the positioning holes 81 may be set as needed, and the inner end of the positioning pin 2 may be inserted into one of the positioning holes 81 for positioning. Protective strips 82 are provided vertically on the front and rear side surfaces of the stand column 8, and two sets of rollers 4 are provided correspondingly within the support sleeve 3. When the support sleeve 3 is adjusted vertically along the stand column 8, each set of rollers 4 rolls along the corresponding protective strips 82, reducing friction during movement and protecting the surface of the stand column 8 from scratches. A rotational sleeve 5 is further sleeved around the outer circumference of the support sleeve 3, and the arm 9 is connected to the rotational sleeve 5. The rotational sleeve 5 can drive the arm 9 to rotate horizontally relative to the support sleeve 3. A horizontal rotation adjustment mechanism that can adjust the horizontal rotation angle of the arm 9 is provided on the left side of the stand column 8. Due to the compact structure and minimal space occupancy of the locking and positioning mechanism, the embodiment allows for the simultaneous arrangement of the positioning and locking structures on one side of the stand column 8, while the horizontal rotation adjustment mechanism is arranged on the opposite side of the stand column; rollers 4 and protective strips 82 are symmetrically arranged on the other two sides, thus facilitating the layout of components and the overall assembly.

Figure 7:
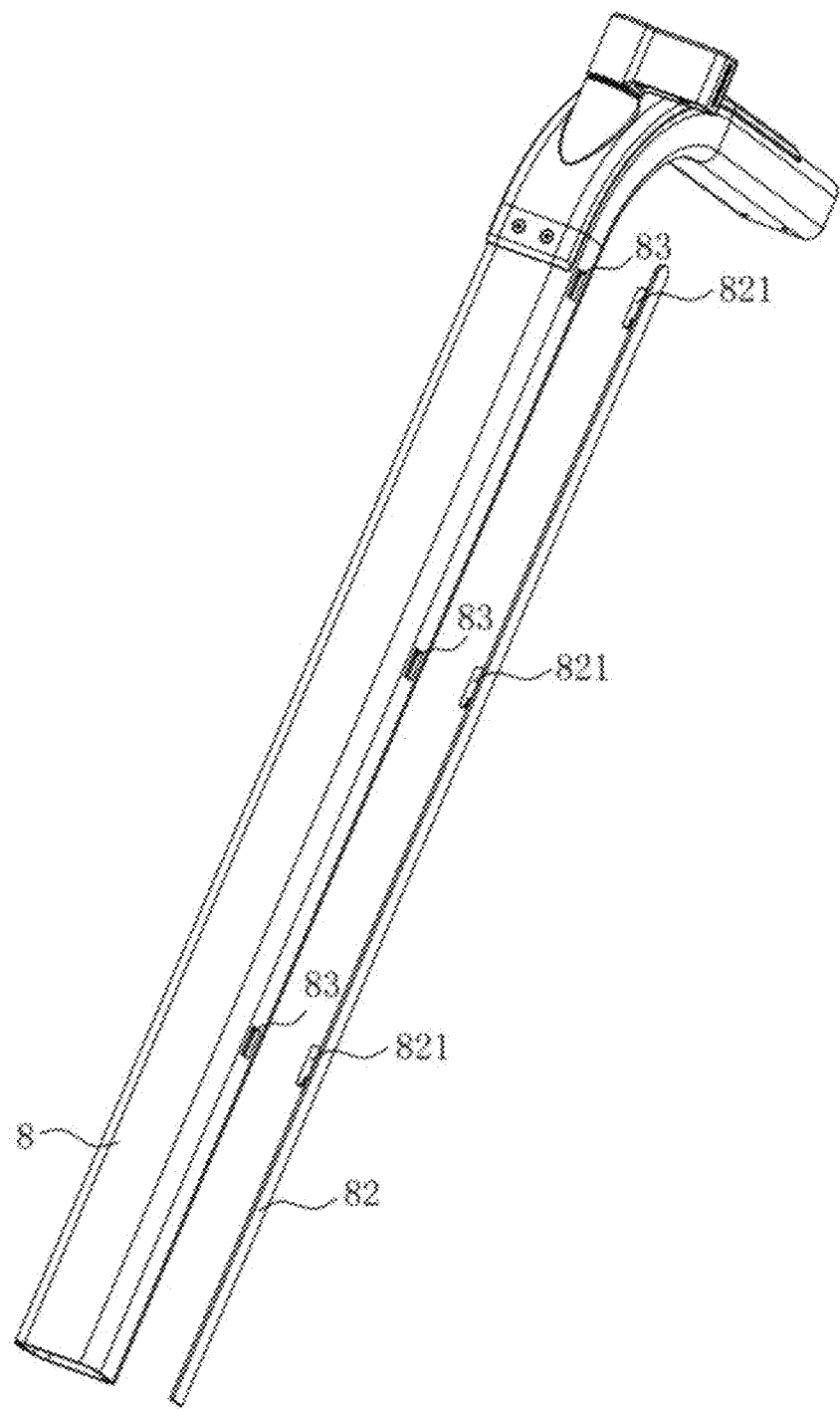
FIG. 7 is a schematic diagram of an installation structure of a protective strip according to the present disclosure.

The protective strips 82 may be fixed to the stand column 8 by means of adhesive bonding, welding, threaded connection, or the like. Or preferably, as shown in FIG. 7, in the embodiment, the protective strip 82 is fixed to the stand column 8 by means of snapping. Specifically, several snaps 821 are formed vertically on the inner side of each protective strip 82, and several snap holes 83 are formed correspondingly on the stand column 8. Each snap 821 fits into a corresponding snap hole 83, allowing for the installation of the protective strip 82. This structure is convenient for installation and makes it easy to replace the protective strip 82.

As shown in FIGS. 3 to 4, in the embodiment, each set of rollers 4 includes two rollers. The two rollers 4 in each set are installed respectively at the upper and lower ends on the same side of the support sleeve 3, which can enhance the stability of the support sleeve 3 during movement. Further, the roller 4 in the embodiment includes a rolling part 41 in the middle and limiting parts 42 at both ends of the rolling part 41. The width of the rolling part 41 is approximately the same as that of the protective strip 82, allowing the rolling part to roll in cooperation with the protective strip 82. The two limiting parts 42 slightly protrude beyond the rolling part 41 and do not contact the stand column 8. When the support sleeve 3 moves vertically, the two limiting parts 42 are positioned respectively on both sides of the protective strip 82 for limiting and guidance, ensuring that the rolling part 41 can roll along the protective strip 82, thus further ensuring the stability of the support sleeve 3 during movement.

Figure 8:
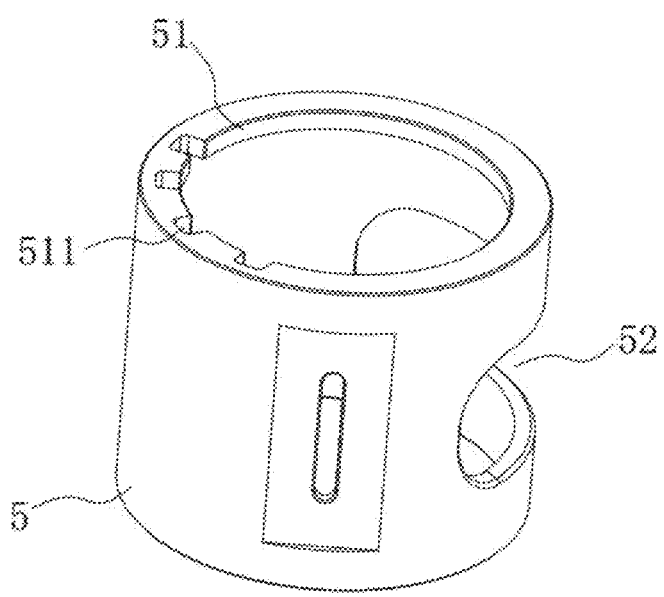
FIG. 8 is a schematic structural diagram of a rotational sleeve according to the present disclosure.
Figure 9:
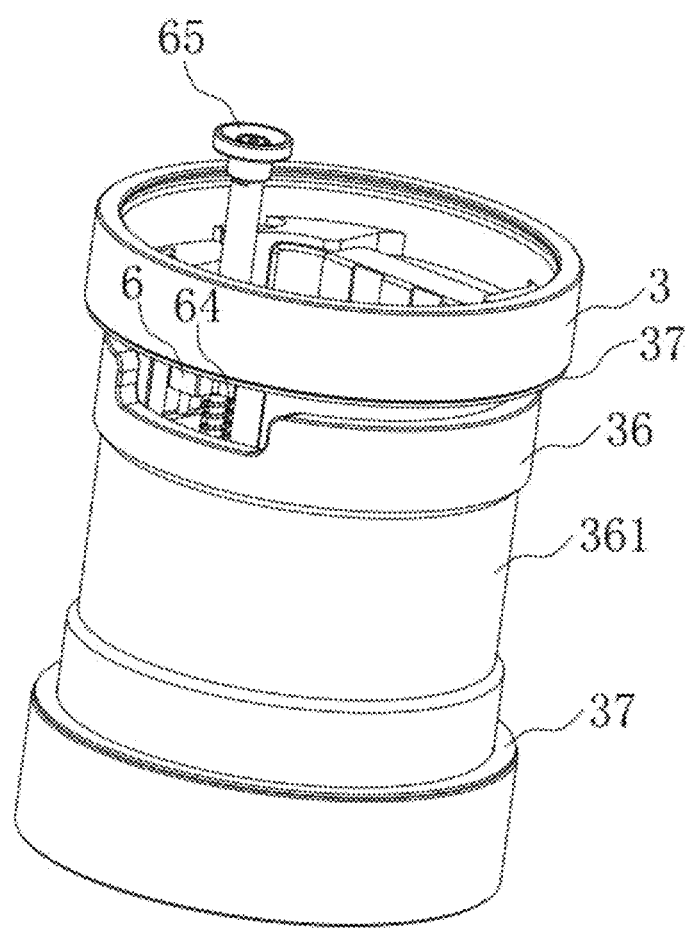
FIG. 9 is a schematic structural diagram of a bushing according to the present disclosure.
Figure 10:
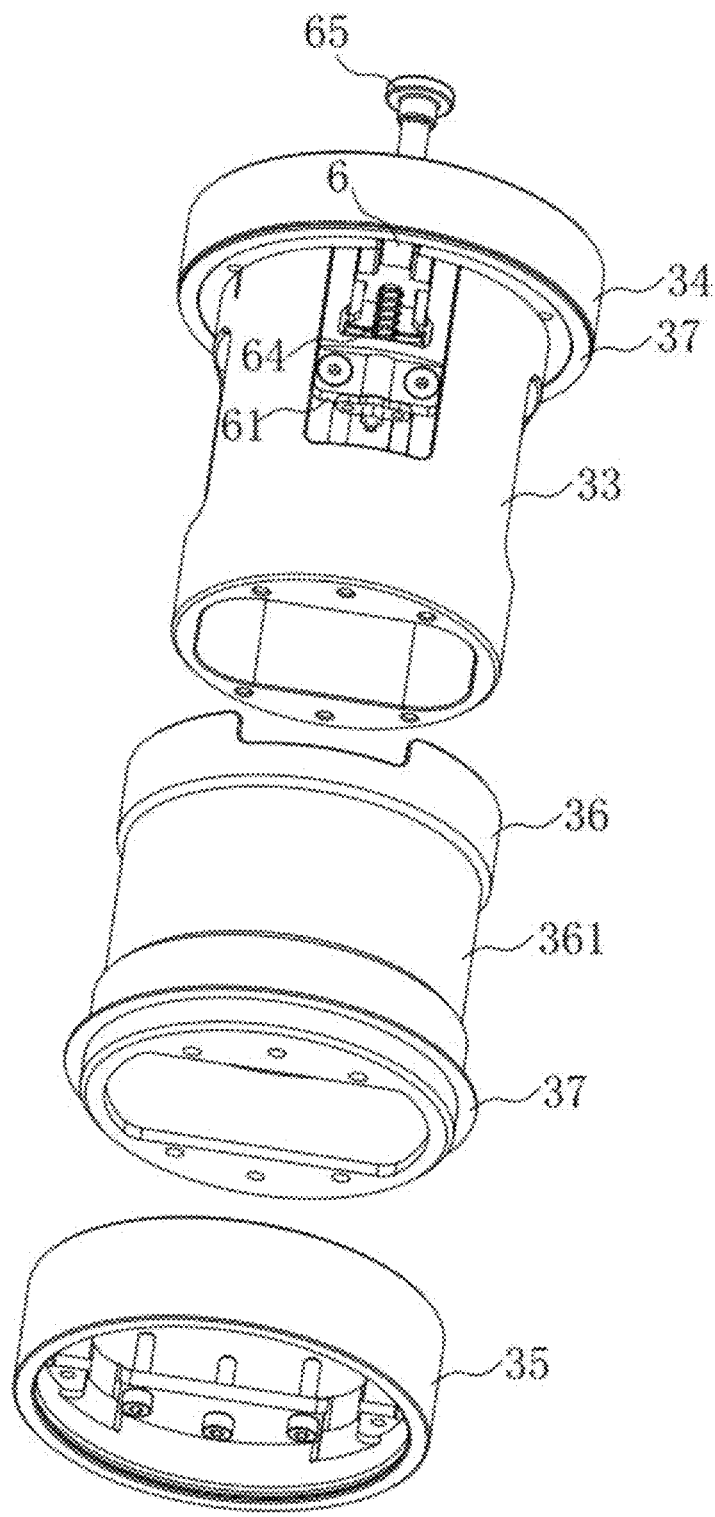
FIG. 10 is an exploded schematic diagram of a support sleeve and a bushing according to the present disclosure.

As shown in FIGS. 8 to 10, the horizontal rotation adjustment mechanism includes a clamping block 6, and the clamping block 6 can move vertically and elastically relative to the support sleeve 3. A protruding edge 51 is inwardly formed at the upper end of the rotational sleeve 5, and a plurality of circumferentially arranged clamping slots 511 are formed on the protruding edge 51. When the rotational sleeve 5 requires lateral adjustment, the clamping block 6 is forced downward to move below the protruding edge 51 of the rotational sleeve 5, thereby not hindering the rotation of the rotational sleeve 5. After the lateral adjustment of the rotational sleeve 5 is completed, the clamping block 6 is released, allowing the clamping block 6 to reset and engage with the currently corresponding clamping slot 511, thus limiting the rotational sleeve 5 and preventing the rotational sleeve 5 from horizontal rotation.

Figure 11:
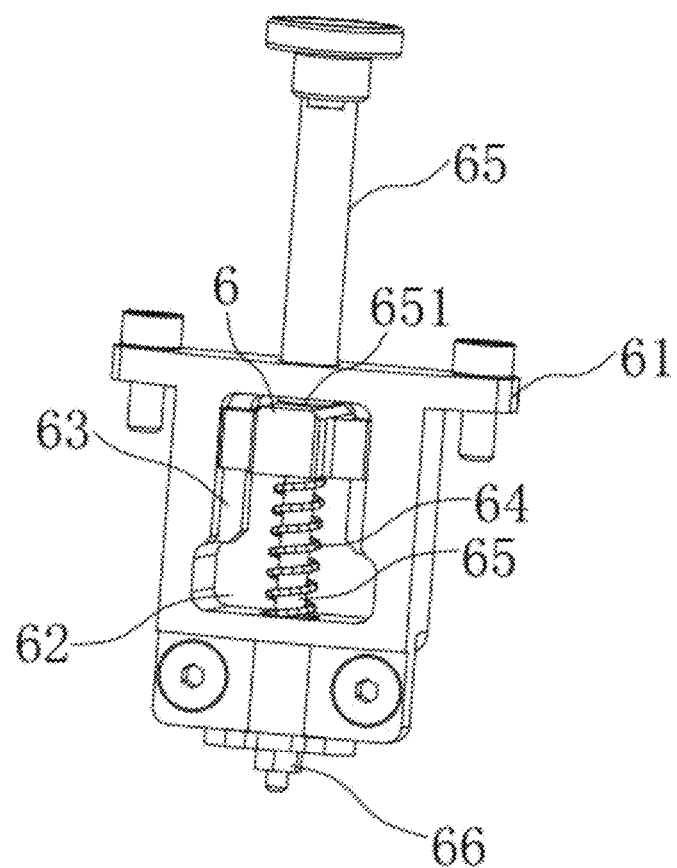
FIG. 11 is a schematic structural diagram of a sliding seat and a pressing rod according to the present disclosure.
Figure 12:
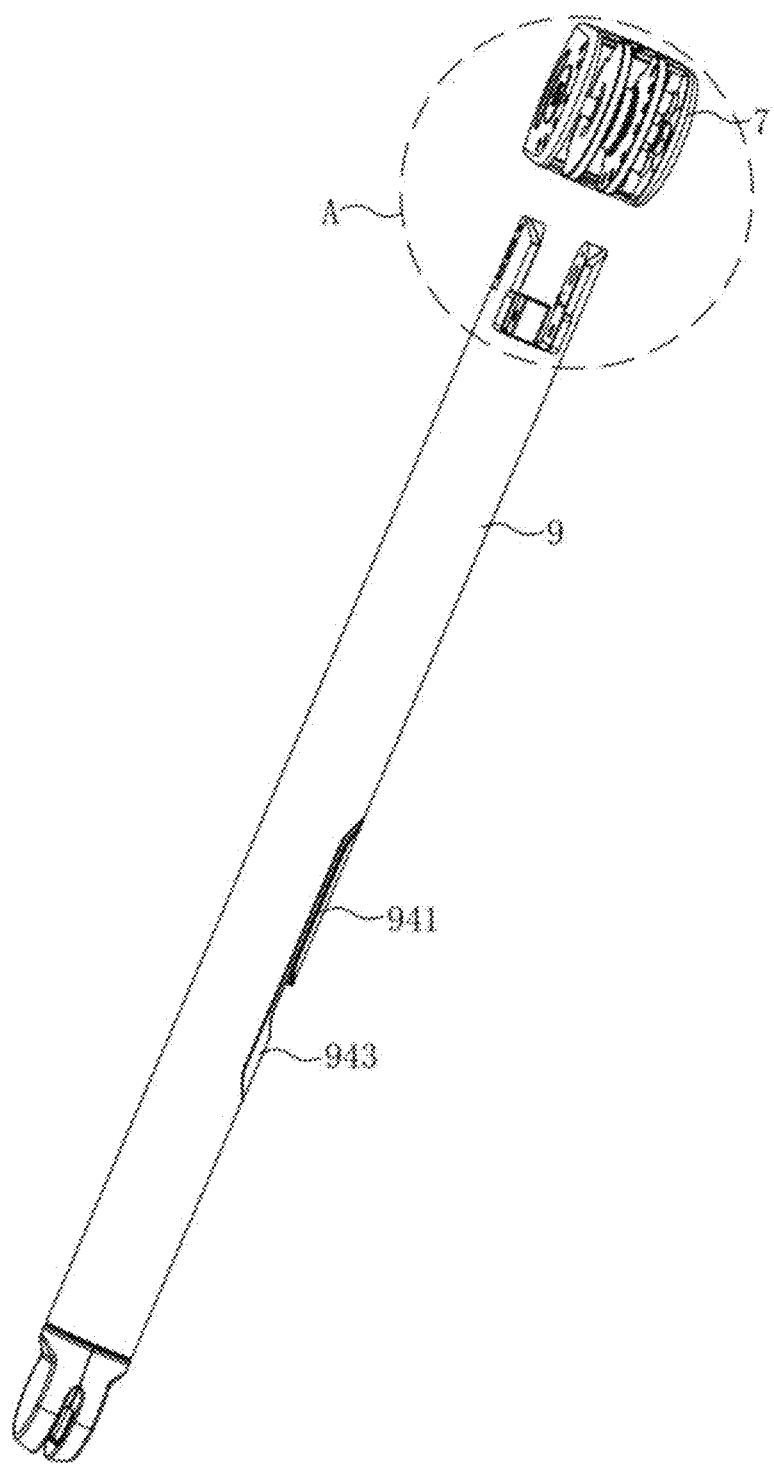
FIG. 12 is an exploded schematic diagram of a first type of vertical swing adjustment mechanism according to the present disclosure.
Figure 13:
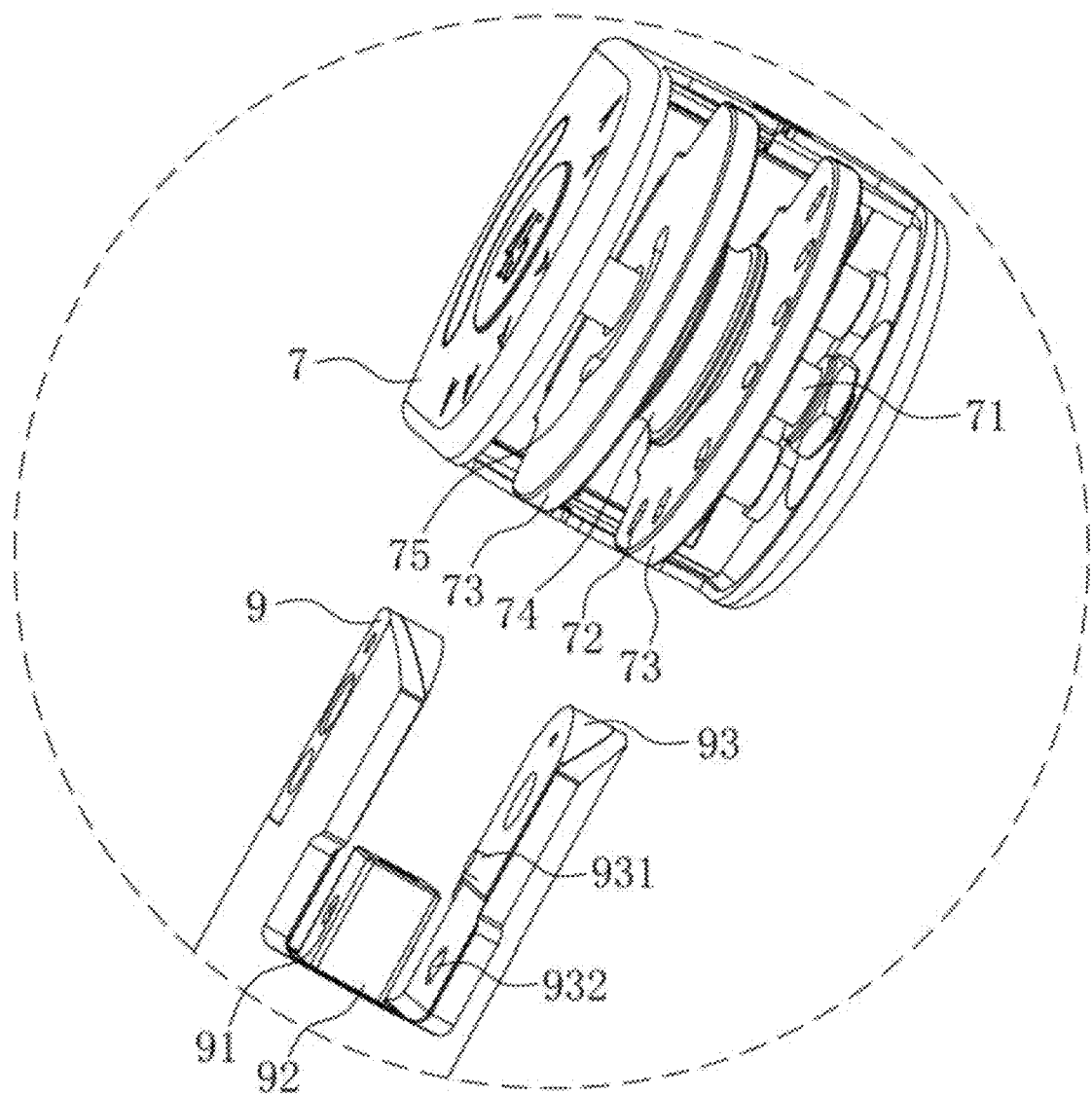
FIG. 13 is an enlarged view of section A in FIG. 12.

Regarding the elastic movement structure of the clamping block 6, as shown in FIGS. 10 to 11, in the embodiment, a sliding seat 61 is fixedly connected to the support sleeve 3. The middle area of the sliding seat 61 forms a sliding groove 62, and vertical sliding strips 63 are formed on the two side walls within the sliding groove 62. The two sides of the clamping block 6 are correspondingly provided with sliders that slidably fit with the sliding strips 63. A portion of the clamping block 6 protrudes outward from the sliding groove 62 for engaging with the corresponding clamping slot 511. A spring 64 is provided at the bottom of the clamping block 6 within the sliding groove 62. When the clamping block 6 moves downward under force, the clamping block compresses the spring 64, and when the clamping block 6 is released, the spring 64 provides a resetting force. In the embodiment, there is also a pressing rod 65 to facilitate a pressing operation. The outer end of the pressing rod 65 extends out of the support sleeve 3, and the inner end of the pressing rod 65 passes through the sliding seat 61, the clamping block 6, and the spring 64, and is connected with a retaining nut 66. A pressuring step 651 contacting the clamping block 6 is formed in the middle part of the pressing rod 65.

The support sleeve 3 in the embodiment includes a rotational installation part 33, a first radial protruding part 34, and a second radial protruding part 35. The rotational installation part 33 is located between the first radial protruding part 34 and the second radial protruding part 35 for rotatably installing the rotational sleeve 5. A bushing 36 is further provided between the rotational installation part 33 and the rotational sleeve 5. The bushing 36 sleeves the rotational installation part 33, and then the rotational sleeve 5 sleeves the bushing 36. Since a slot needs to be formed on the support sleeve 3 for the arrangement of the sliding seat 61, the bushing 36 encircles the sliding seat 61, such that the rotational surface for cooperating with the rotational sleeve 5 can be more complete, which is beneficial for the rotation of the rotational sleeve 5. Furthermore, in the embodiment, the middle part of the outer wall of the bushing 36 is recessed inward to form a groove 361, thereby reducing the contact area between the bushing 36 and the rotational sleeve 5, which reduces resistance during rotation and further facilitates the rotation of the rotational sleeve 5. In the embodiment, a long slot 52 is further formed on the rotational sleeve 5 to avoid the locking knob 1 and the positioning pin 2 during rotation. In the embodiment, metal annular washers 37 are further provided between the rotational sleeve 5 and the first radial protruding part 34, as well as between the rotational sleeve 5 and the second radial protruding part 35, which can reduce wear during rotation.

From the above content, it is clear that the rotational folding positioning apparatus provided according to the embodiment allows the arm not only to slide vertically along the stand column to adjust the height but also to perform horizontal rotation adjustments.

Embodiment III

In Embodiment II, the vertical height adjustment and horizontal rotation adjustment of the arm 9 are achieved. This embodiment further improves by providing a vertical swing adjustment mechanism that allows the arm 9 to swing and fold vertically.

Specifically, as shown in FIGS. 1, 2, and 12 to 17, a hinge seat 7 is provided on the rotational sleeve 5, and the arm 9 is hinged to the hinge seat 7. The arm 9 and the hinge seat 7 can rotate horizontally together with the rotational sleeve 5. A plurality of locking grooves 72, arranged in a circumferential direction and centered on the hinge shaft 71, are further formed on the hinge seat 7; a locking member 91 is provided correspondingly on the arm 9, and the locking member 91 can extend and retract along an axial direction parallel to the hinge shaft 71. When the locking member 91 extends, it enters one of the locking grooves 72, locking the arm 9 so that the arm 9 cannot rotate relative to the hinge seat 7. When the arm 9 needs to be rotationally adjusted, the locking member 91 retracts under force to disengage from the locking groove 72, releasing the lock on the arm 9, and allowing the arm 9 to rotate relative to the hinge seat 7 for adjustment. After the adjustment is completed, the locking member 91 can cooperate with other locking grooves 72 for locking, thereby achieving the adjustment of the vertical swing angle. The number and circumferential spacing of the locking grooves 72 can be set as needed.

In the embodiment, the hinge seat 7 is provided with two parallel lock plates 73 that are perpendicular to the hinge shaft 71. An intermediate pulley 74 is provided between the two lock plates 73 to guide the pull rope 84 that passes through the arm 9. Locking grooves 72 are symmetrically formed on the opposing surfaces of the two lock plates 73. There are also two locking members 91, which respectively cooperate with the locking grooves 72 on the two lock plates 73 for locking and unlocking. Specifically, a fixed seat 92 is further fixedly connected within the arm 9. One end of the fixed seat 92 is located between the two lock plates 73 and is provided thereon with two through holes 921 for the locking members 91 to extend and retract. Each locking member 91 moves within the corresponding through hole 921, extending and retracting to achieve locking and unlocking. Thus, the embodiment improves the stability after locking by arranging two sets of locking grooves 72 and two corresponding locking members 91 to cooperate for locking.

Figure 14:
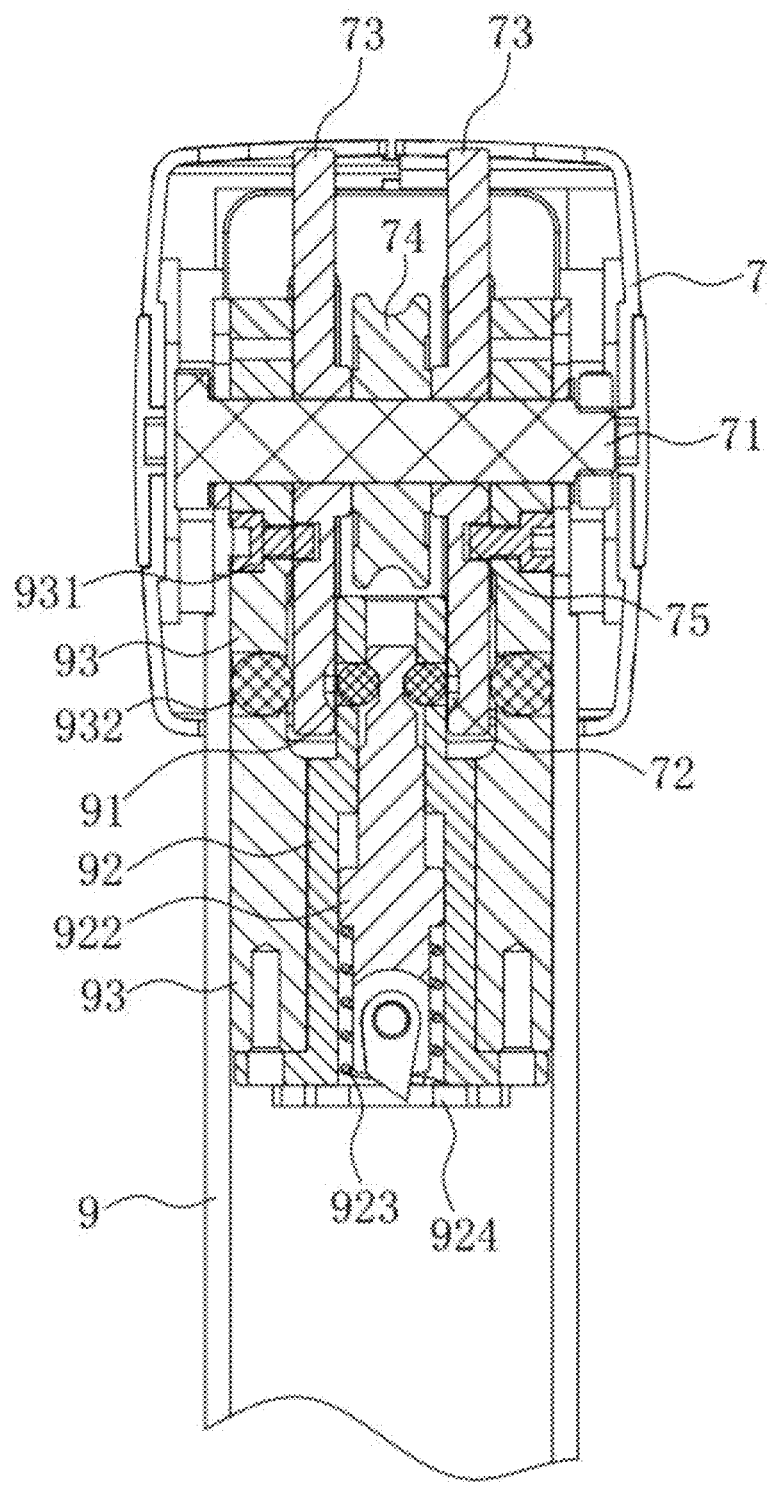
FIG. 14 is a cross-sectional view of a first type of vertical swing adjustment mechanism according to the present disclosure.
Figure 15:
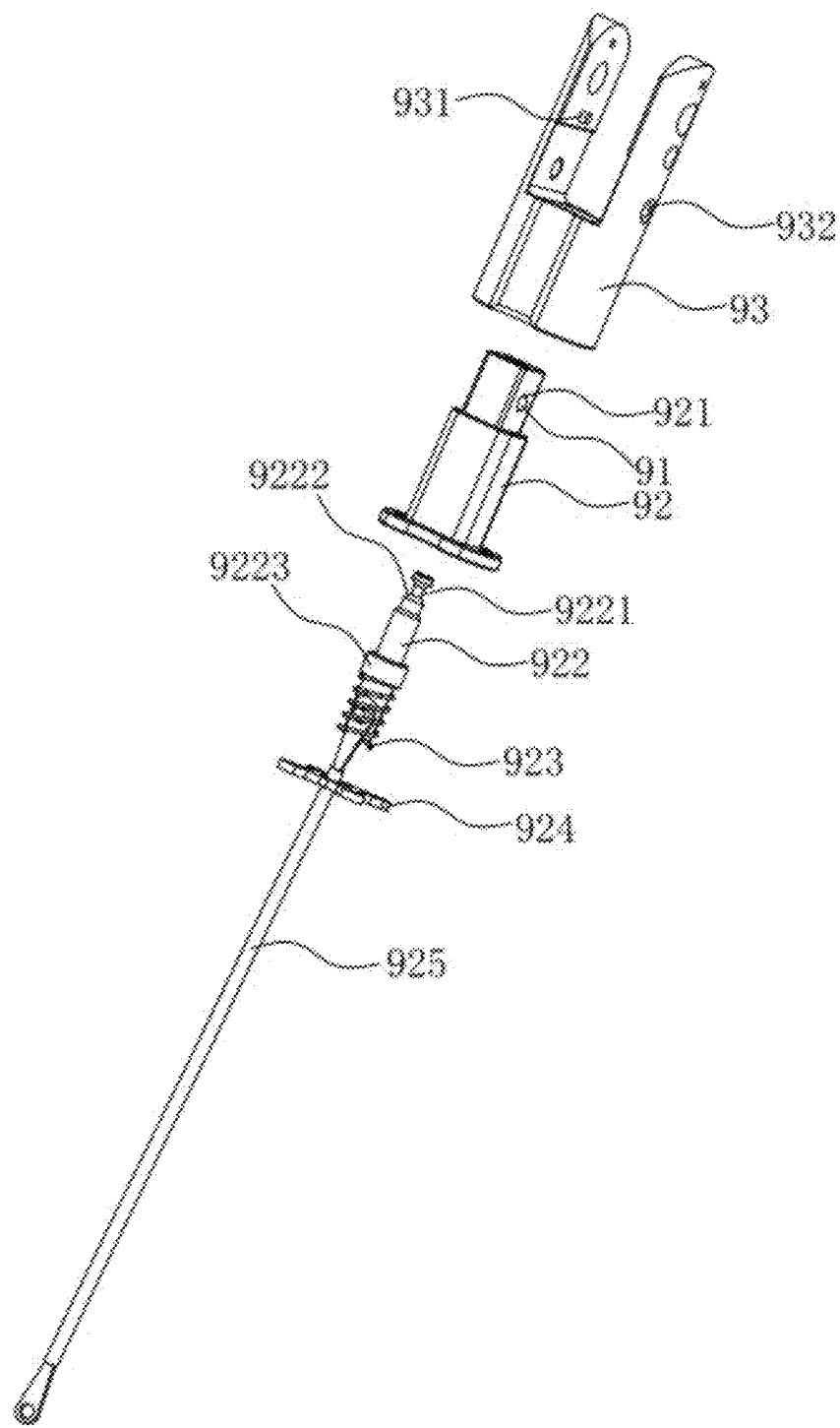
FIG. 15 is an exploded schematic diagram of a fixed seat and a lock cylinder in a first type of vertical swing adjustment mechanism according to the present disclosure.
Figure 16:
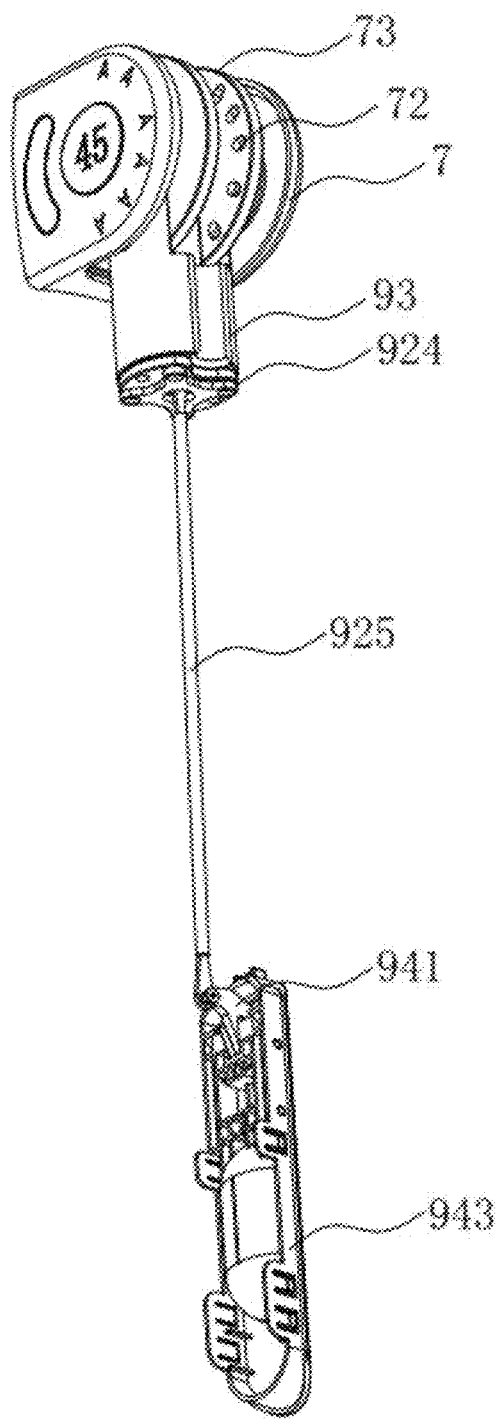
FIG. 16 is a schematic structural diagram of an operating mechanism in a first type of vertical swing adjustment mechanism according to the present disclosure.
Figure 17:
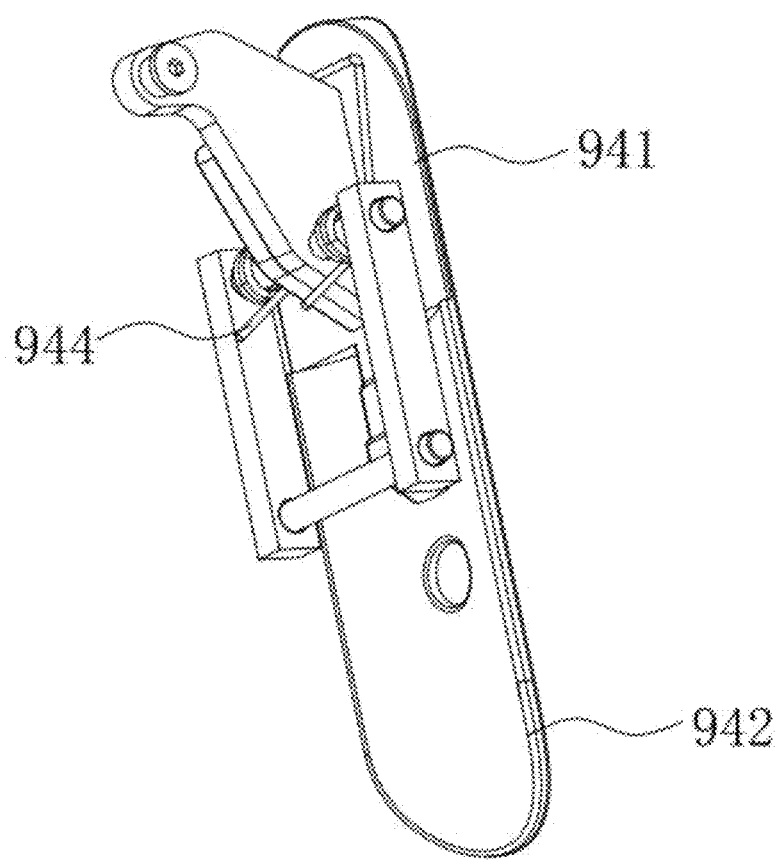
FIG. 17 is a schematic structural diagram of an operating member in a first type of vertical swing adjustment mechanism according to the present disclosure.
Figure 18:
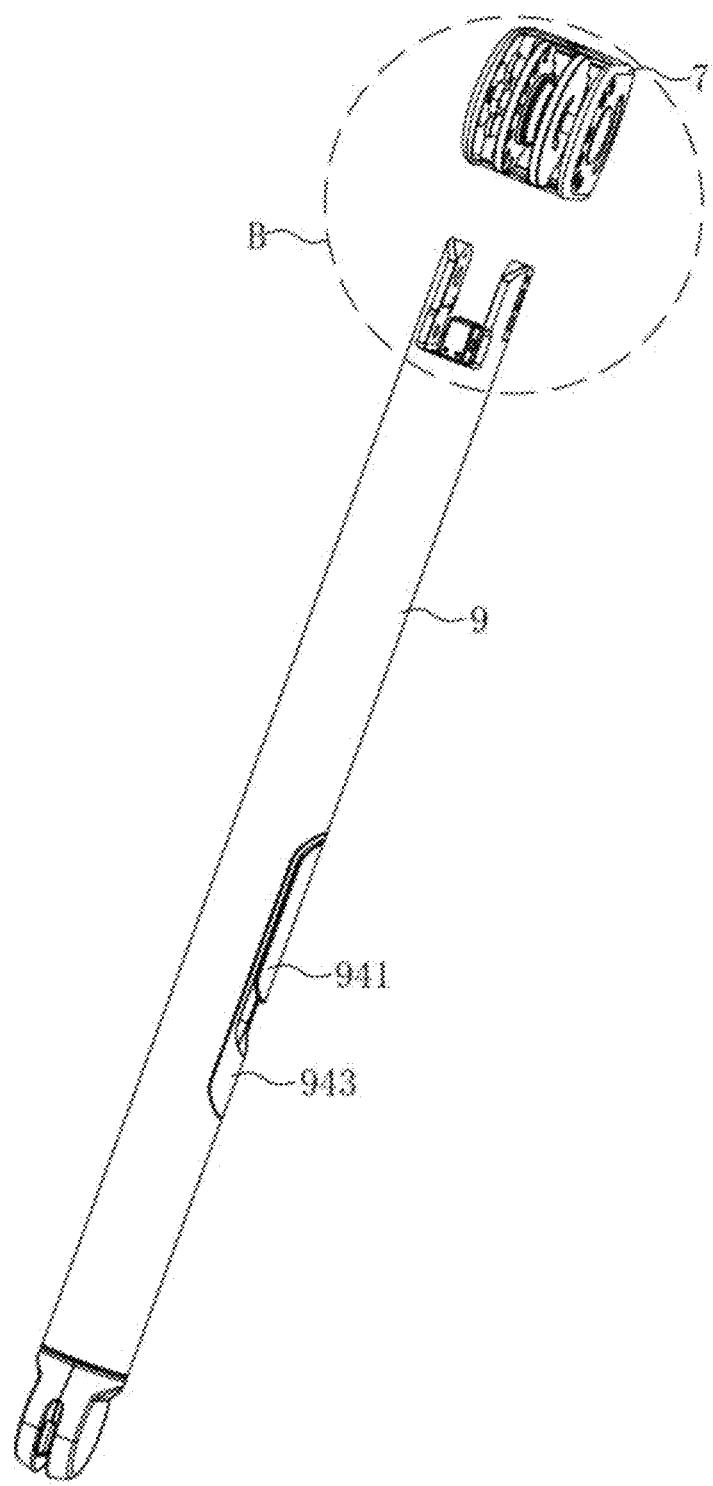
FIG. 18 is an exploded schematic diagram of a second type of vertical swing adjustment mechanism according to the present disclosure.
Figure 19:
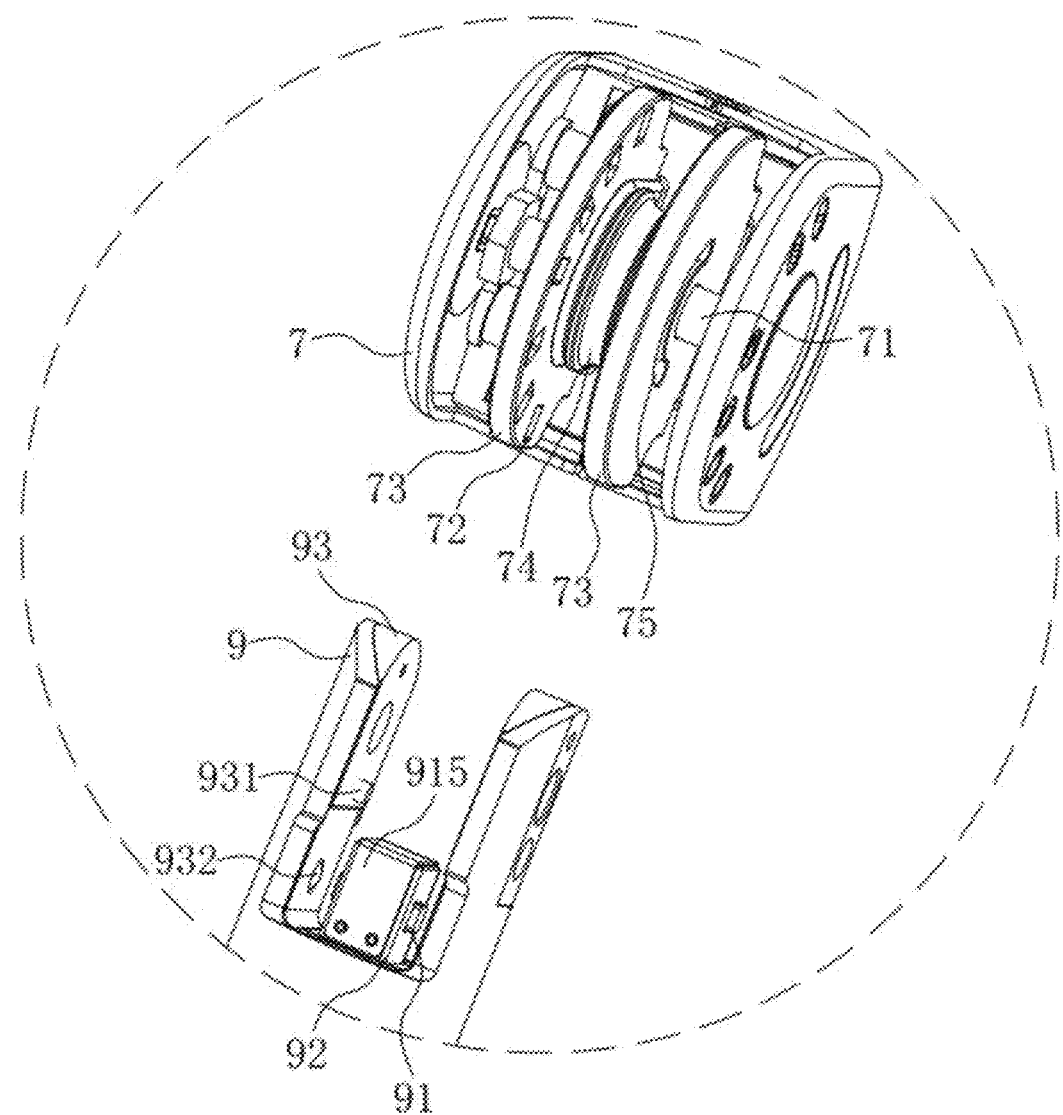
FIG. 19 is an enlarged view of section B in FIG. 18.
Figure 20:
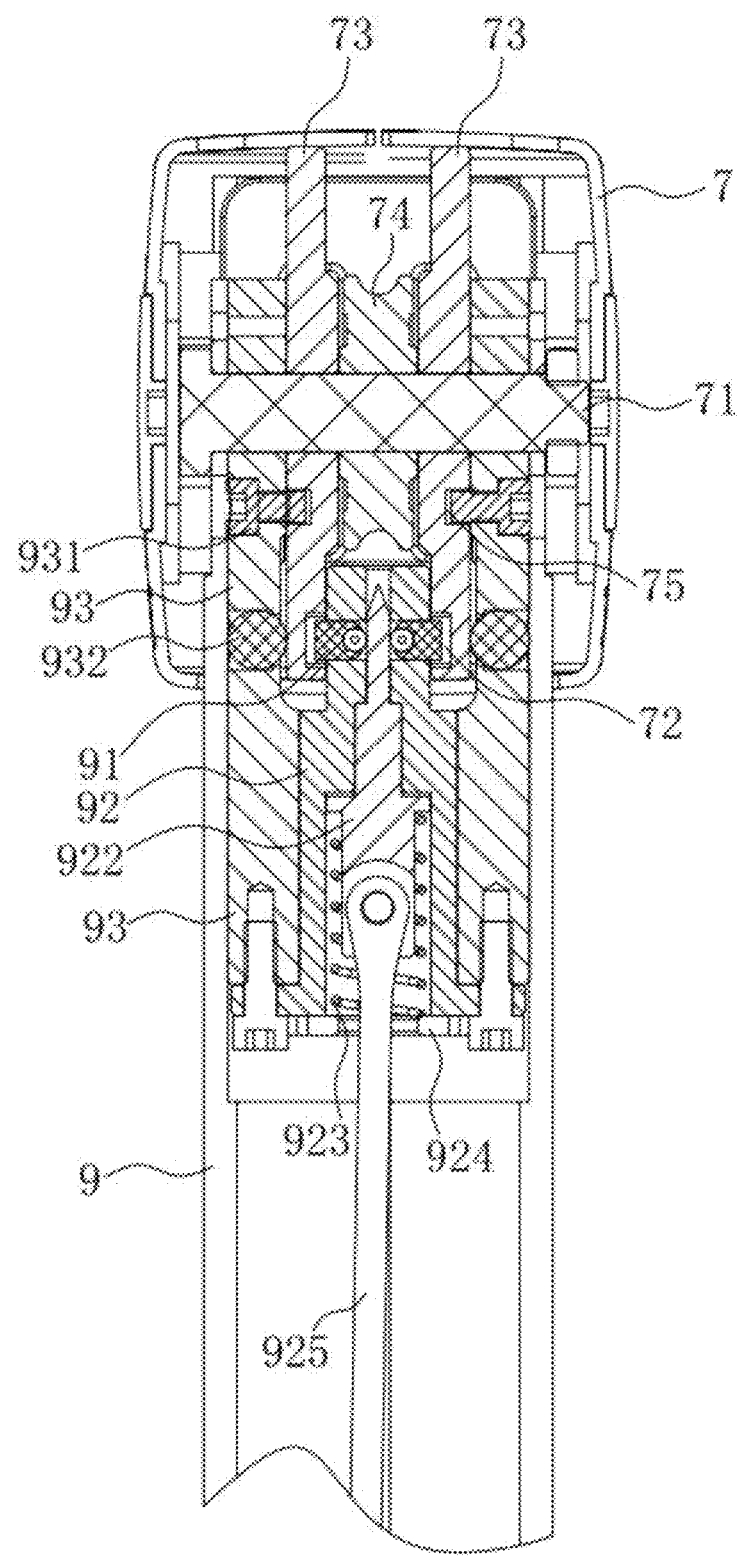
FIG. 20 is a cross-sectional view of a second type of vertical swing adjustment mechanism according to the present disclosure.
Figure 21:
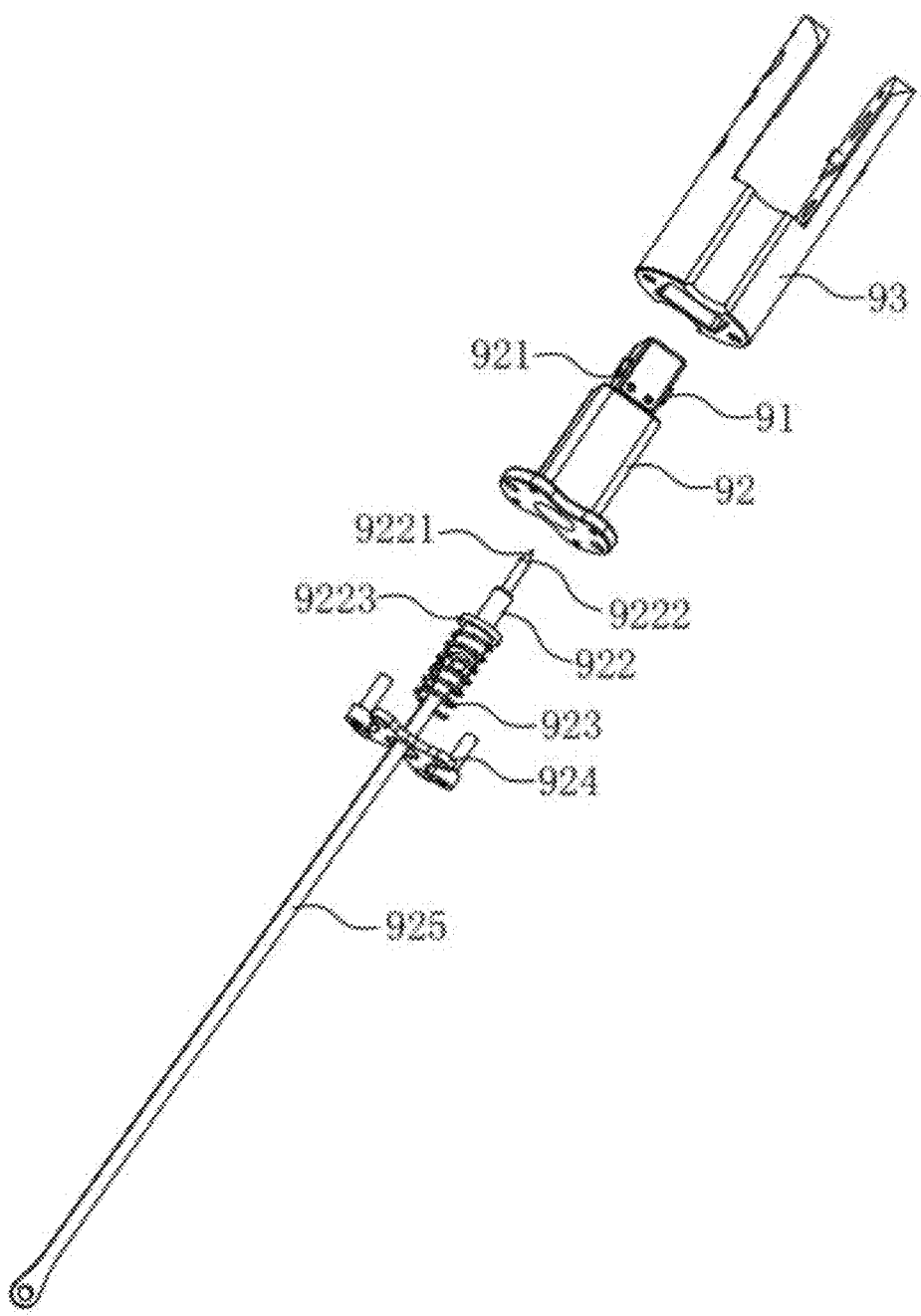
FIG. 21 is an exploded schematic diagram of a fixed seat and a lock cylinder in a second type of vertical swing adjustment mechanism according to the present disclosure.
Figure 22:
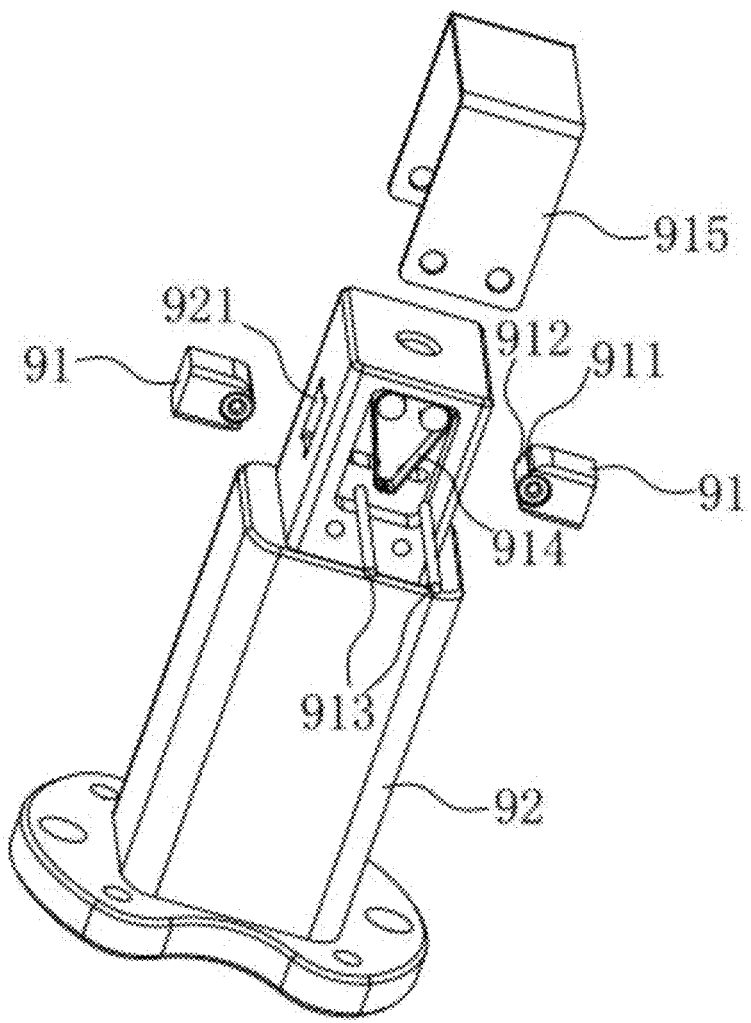
FIG. 22 is an exploded schematic diagram of a fixed seat in a second type of vertical swing adjustment mechanism according to the present disclosure.

Further, as shown in FIGS. 14 to 15, a lock cylinder 922 is slidably arranged within the fixed seat 92, and a recessed part 9221 that is circumferentially and inwardly recessed is formed on the lock cylinder 922. The lock cylinder 922 can slide along the length direction of the arm 9 toward or away from the hinge shaft 71. When the lock cylinder 922 slides toward the hinge shaft 71, the recessed part 9221 can be offset from the through hole 921, forcing the locking member 91 to simultaneously extend into the through hole 921 of the fixed seat 92 and the locking groove 72 of the lock plate 73 for locking, and in this case, the arm 9 cannot rotate relative to the hinge seat 7; when the lock cylinder 922 slides away from the hinge shaft 71, the recessed part 9221 can align with the through hole 921, and thus the locking member 91 can disengage from the locking groove 72 of the lock plate 73, thereby releasing the lock; in this case, the arm 9 can rotate relative to the hinge seat 7.

As one implementation of the embodiment, the locking groove 72 is an arc-shaped groove, the locking member 91 is a locking ball, and the through hole 921 in the fixed seat 92 is a circular hole; a conical surface 9222 that can push the locking ball to extend outward is further formed on the recessed part 9221 of the lock cylinder 922. Thus, when the arm 9 does not need to be rotationally adjusted, the lock cylinder 922 moves toward the hinge shaft 71 and is held in a set position. The conical surface 9222 on the lock cylinder 922 pushes the locking ball to move outward. When the lock cylinder 922 moves to the set position, the recessed part 9221 on the lock cylinder 922 is offset from the through hole 921 on the fixed seat 92, positioning the locking ball simultaneously in the through hole 921 on the fixed seat 92 and the locking groove 72 on the lock plate 73. When the arm 9 needs to be rotationally adjusted, the lock cylinder 922 is moved away from the hinge shaft 71 to another set position, aligning the recessed part 9221 on the lock cylinder 922 with the through hole 921 on the fixed seat 92. As the arm 9 rotates, the locking ball, under the action of the arc-shaped groove in the lock plate 73, adaptively retracts inward and disengages from the arc-shaped groove, such that the rotational adjustment of the arm 9 can be achieved.

Regarding the movement structure of the lock cylinder 922, in the embodiment, an end seat 924 is provided at the other end of the fixed seat 92. A radial protrusion 9223 is formed in the middle part of the lock cylinder 922, and a compressed spring 923 is provided between one end of the radial protrusion 9223 and the end seat 924. In the locked state, the radial protrusion 9223, under the force of the compressed spring 923, moves to a set position, causing its recessed part 9221 to be offset from the through hole 921 of the fixed seat 92. In this case, the arm 9 cannot be rotationally adjusted relative to the hinge seat 7. Further, the lock cylinder 922 is further connected to a pull rod 925. One end of the pull rod 925 is hinged to the tail end of the lock cylinder 922, and the other end of the pull rod 925 is connected to an operating mechanism on the arm 9. When the operating mechanism is in motion, the pull rod 925 overcomes the force of the compressed spring 923 and pulls the lock cylinder 922 away from the hinge shaft 71 to another set position, thereby aligning the recessed part 9221 of the lock cylinder 922 with the through hole 921 of the fixed seat 92. In this case, the arm 9 can be rotationally adjusted relative to the hinge seat 7.

Further, the operating mechanism in the embodiment includes an operating member 941, and the operating member 941 is installed on the arm 9 at a position suitable for manual operation via an installation seat 943. The middle part of the operating member 941 is hinged to the installation seat 943; one end of the operating member 941 is connected to the pull rod 925, and the other end of the operating member 941 is formed as an operating end 942, creating a lever mechanism. When the operating end 942 is pulled outward, the operating member 941 drives the pull rod 925 to move, and the pull rod 925 pulls the lock cylinder 922 to move away from the hinge seat 7. Preferably, the operating mechanism further includes a resetting member 944, which may be, but is not limited to, a torsion spring. The resetting member ensures the resetting of the operating member 941 after the unlocking operation and meanwhile provides damping force during operation.

In the embodiment, a connecting seat 93 is further provided between the arm 9 and the fixed seat 92, that is, the fixed seat 92 is indirectly and fixedly connected to the arm 9 via the connecting seat 93. The connecting seat 93 and the arm 9 together protrude to form a U-shaped connecting part.

Guide posts 931 are symmetrically formed on both sides of the U-shaped connecting part, and the guide posts 931 may be screws. Arc-shaped guide slots 75 centered on the hinge shaft 71 are respectively formed symmetrically on the back surfaces of the two lock plates 73. When the arm 9 rotates relative to the hinge seat 7, the guide posts 931 slide within the corresponding arc-shaped guide slots 75. Furthermore, preferably, in the embodiment, two notches are symmetrically formed on the inner side of the connecting seat 93, and a ball 932 is placed in each notch. When the arm 9 rotates relative to the hinge seat 7, the two balls 932 respectively roll along an arc on the back surfaces of the two lock plates 73, which can reduce friction and enhance the stability and flexibility of the arm 9 during rotation.

Regarding the locking structure of the locking groove and the locking member, as another implementation of the embodiment, as shown in FIGS. 18 to 22, the locking groove 72 is a square groove, and the protruding outer end of the locking member 91 is roughly square and may have a certain chamfer. The protruding outer end corresponds to and cooperates with the locking groove 72 to achieve locking. Compared to the cooperation of the spherical locking member 91 and the arc-shaped locking groove 72 mentioned earlier, the square locking member 91 and locking groove 72 provide a more stable locking structure.

Further, the inner end of the locking member 91 is arc-shaped, for example, a cylindrical or spherical surface. A conical surface 9222, which can push the inner end of the locking member 91 to make the locking member 91 extend outward, is formed on the recessed part 9221 of the lock cylinder 922. The recessed part 9221 can be formed on the lock cylinder 922 near the position of the hinge shaft 71, or the recessed part can even be formed at the end facing the hinge shaft 71, i.e., shaped as a conical tip.

Since in the implementation, the protruding outer end of the locking member 91 and the locking groove 72 are square, the locking member 91 cannot be forced to retract inward by the locking groove 72 when the arm 9 rotates. To address this, in the implementation, the fixed seat 92 is further provided with an elastic structure capable of forcing the locking member 91 to retract inward.

Figure 23:
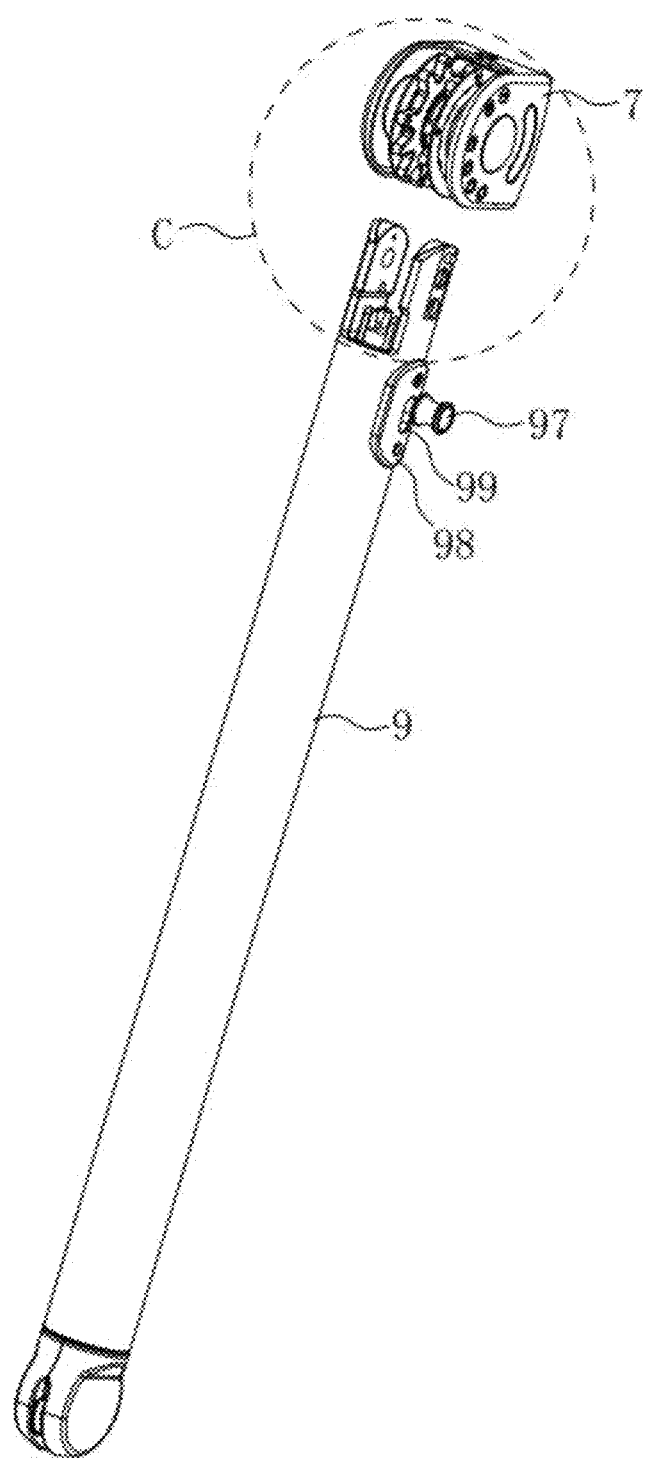
FIG. 23 is an exploded schematic diagram of a third type of vertical swing adjustment mechanism according to the present disclosure.
Figure 24:
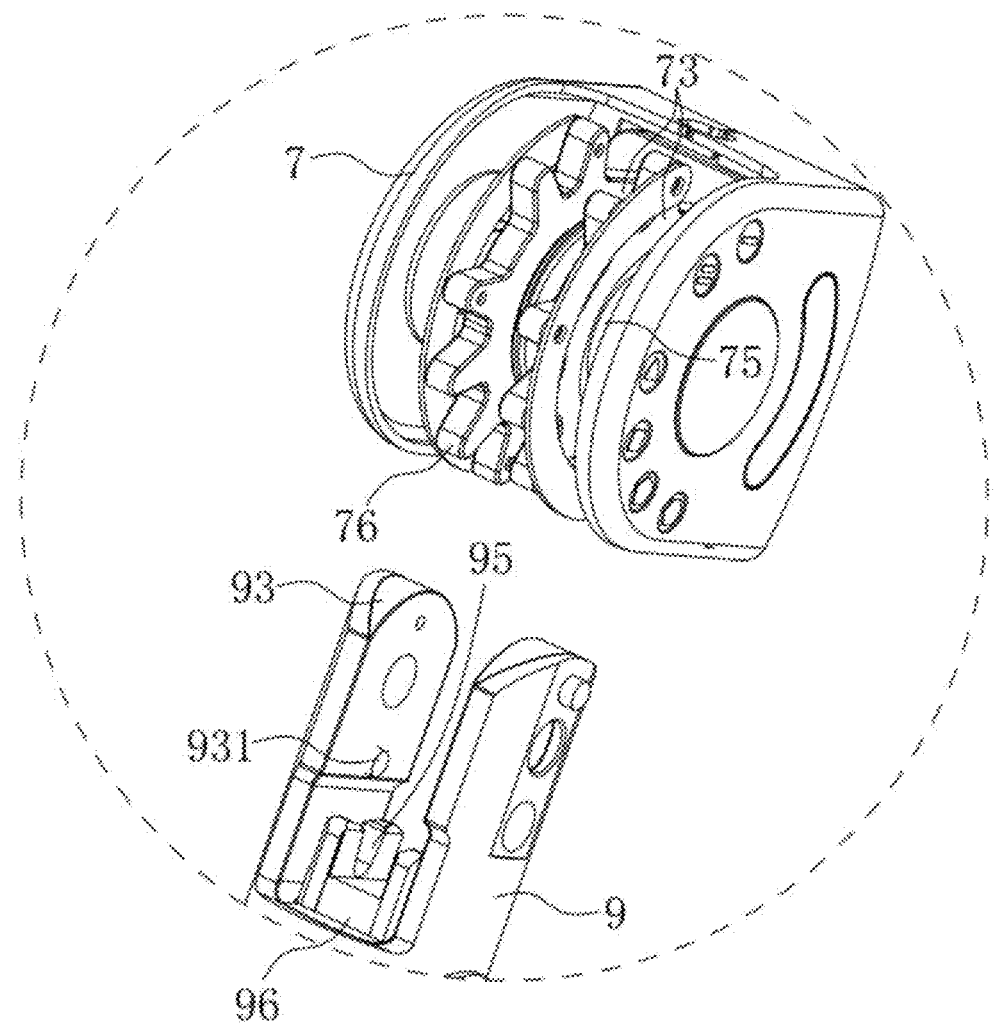
FIG. 24 is an enlarged view of section C in FIG. 23.

A notched cylindrical groove 911 is formed on the inner end of the locking member 91, and a roller pin 912 is provided to pass through the side surface of the notched cylindrical groove 911. The outer wall of the roller pin 912 protrudes through the notch of the notched cylindrical groove 911 and can rollably cooperate with the lock cylinder 922. Moreover, the size of the notch is smaller than the size of the roller pin 912, preventing the roller pin 912 from slipping out of the notch. After the locking members 91 with the roller pins 912 are installed into the corresponding square through holes 921 on the fixed seat 92, two corresponding connecting shafts 913 are further provided to pass through from the side surface. The length direction of the connecting shafts 913 is perpendicular to the extension direction of the locking member 91 and perpendicular to the movement direction of the lock cylinder 922. The connecting shafts 913 penetrate through the fixed seat 92 and exactly pass through the center of the corresponding roller pins 912. When the connecting shafts 913 move laterally, as shown in FIG. 23, they can drive the corresponding locking members 91 to move inward or outward. Moreover, elongated holes need to be formed on the fixed seat 92 to allow the connecting shafts 913 to move laterally.

Further, the elastic structure includes two circlips 914 symmetrically arranged on both sides of the fixed seat 92. The circlips 914 are roughly in the shape of an isosceles triangle, and the two connecting shafts 913 are located within the triangle and near the vertex corner. The two bottom corners of the triangle are supported, and the vertex corner is open. In the locked state of the arm 9, the lock cylinder 922 moves under the action of the compressed spring 923 to push the two locking members 91 outward, and the locking members 91 drive the connecting shafts 913 to move, causing the circlips 914 to deform. When the arm 9 needs adjustment, the operating end 942 of the operating mechanism is toggled, and the pull rod 925 drives the locking members 91 to move away from the hinge shaft 71. The recessed part 9221, i.e., the tip end of the lock cylinder 922, aligns with the through hole 921 on the fixed seat 92, and the lock cylinder 922 does not act on the roller pins 912. In this case, the circlips 914 act on both ends of the connecting shafts 913, causing the connecting shafts 913 to drive the locking members 91 to retract inward, thus enabling the adjustment of the arm 9. Furthermore, in the implementation, a limiting plate 915 is further provided at one end of the fixed seat 92. The limiting plate 915 is preferably a U-shaped plate, fixedly connected to the fixed seat 92, and limits both ends of the connecting shafts 913 and the circlips 914, preventing them from slipping out.

From the above content, it is clear that the rotational folding positioning apparatus provided according to the embodiment can achieve the vertical swing and folding adjustments of the arm. Moreover, the apparatus features a simple structure and is easy to operate.

Embodiment IV

Compared to Embodiment III, the embodiment provides another type of vertical swing adjustment mechanism that allows the arm 9 to swing vertically.

Specifically, as shown in FIGS. 1, 2, and 23 to 27, in the embodiment, a hinge seat 7 is provided on the rotational sleeve 5, and the arm 9 is hinged to the hinge seat 7, such that the arm 9 and the hinge seat 7 can rotate horizontally together with the rotational sleeve 5. A plurality of lock teeth 76, arranged in a circumferential direction and centered on the hinge shaft 71, are further formed on the hinge seat 7. A moving seat 96 is provided within the arm 9, and the moving seat 96 can slide within the arm 9 towards or away from the hinge shaft 71. A lock groove 95 is formed on one end, facing the hinge shaft 71, of the moving seat 96, and the moving seat 96 can move towards the hinge shaft 71 under the action of the compressed spring 923, causing the lock groove 95 of the moving seat 96 to engage correspondingly with one of the lock teeth 76, thereby locking the moving seat 96 and the hinge seat 7.

In the embodiment, the moving seat 96 is further provided with a locking piece 964 that can elastically extend and retract perpendicularly to the sliding direction of the moving seat. A corresponding locking slot 933 is directly or indirectly formed on the arm 9. The locking piece 964, when extending into the locking slot 933, can lock the moving seat 96 and the arm 9. Since the moving seat 96 is also locked to the hinge seat 7, the arm 9 cannot swing vertically relative to the hinge seat 7. If the arm 9 needs to be rotated, the locking piece 964 is first controlled to retract, releasing the lock between the arm 9 and the moving seat 96; then, the moving seat 96 is controlled to move away from the hinge shaft 71, releasing the lock between the lock groove 95 and the lock teeth 76. The retractable structure of the locking piece 964 can adopt any existing structure. Furthermore, the movement of the locking piece 964 and the moving seat 96 during unlocking can be achieved by any means, such as using a pressing rod or a lever.

Preferably, in the embodiment, the hinge seat 7 is provided with two parallel lock plates 73 that are perpendicular to the hinge shaft 71. An intermediate pulley 74 is arranged between the two lock plates 73, and lock teeth 76 are symmetrically formed on the two lock plates 73. Correspondingly, the moving seat 96 is further provided with two symmetrical lock grooves 95, such that the stability during locking can be enhanced.

In the embodiment, a connecting seat 93 is fixedly connected within the arm 9, and the moving seat 96 is slidably arranged within the connecting seat 93. An opening is formed on one end, facing the hinge shaft 71, of the connecting seat 93, such that the lock grooves 95 on one end, facing the hinge shaft 71, of the moving seat 96 can cooperate with the lock teeth 76 on the hinge seat 7. A compressed spring 923 is arranged between one end, away from the hinge shaft 71, of the connecting seat 93 and one end, away from the hinge shaft 71, of the moving seat 96. The compressed spring 923 acts on the moving seat 96 when the arm 9 needs to be locked, causing the moving seat to move towards the hinge shaft 71 and engage the lock grooves 95 with the lock teeth 76.

Regarding the locking structure of the moving seat 96 and the arm 9, in the embodiment, the locking slot 933 is formed inwardly on the connecting seat 93 within the arm 9. A retractable slot 961 is formed on the moving seat 96 for the locking piece 964 to extend and retract. When the locking piece 964 simultaneously engages both the retractable slot 961 and the locking slot 933, the arm 9 and the moving seat 96 are locked. The locking piece 964 may be cylindrical, with its axial direction being the direction of its retractable movement. Correspondingly, both the retractable slot 961 and the locking slot 933 are circular slots, that is, their cross-sections are circular. Alternatively, the locking piece 964 may be square, such as a cuboid or a cube. Correspondingly, both the retractable slot 961 and the locking slot 933 are square slots, that is, their cross-sections are square. In this way, the stability during the locking of the moving seat 96 and the arm 9 can be enhanced.

In the embodiment, a compression spring 963 is further provided at the inner end of the locking piece 964. In the locked state of the arm 9, the compression spring 963 pushes the locking piece 964 outward, causing the locking piece to engage in the locking slot 933 on the connecting seat 93. Preferably, a receiving groove 962 is further formed at the inner end of the retractable slot 961 in the moving seat 96. The cross-sectional size of the receiving groove 962 is smaller than that of the retractable slot 961. The compression spring 963 is arranged within the receiving groove 962, which can enhance the stability of the compression spring 963 during movement.

To facilitate the unlocking operation, the embodiment further includes an operating rod 97 that can drive the movement of the locking piece 964 for unlocking. The outer end of the operating rod 97 extends outward from the arm 9, and the outer end of the operating rod 97 can be designed in a shape convenient for operation as needed. The operating rod 97 can be fixedly connected to the locking piece 964. During unlocking, the operating rod 97 is first pressed inward to cause the locking piece 964 to retract into the retractable slot 961, and then the operating rod 97 is pulled in the direction away from the hinge seat 7, driving the moving seat 96 to move away from the hinge shaft 71, thereby disengaging the lock grooves 95 of the moving seat from the lock teeth 76 of the hinge seat 7; in this case, the arm 9 can rotate. After the rotational adjustment of the arm 9 is completed, the operating rod 97 is released. Under the action of the compressed spring 923, the moving seat 96 resets and cooperates with the lock teeth 76 for locking, and under the action of the compression spring 963, the locking piece 964 engages again in the locking slot 933 for locking; in this case, the arm 9 cannot rotate.

Figure 25:
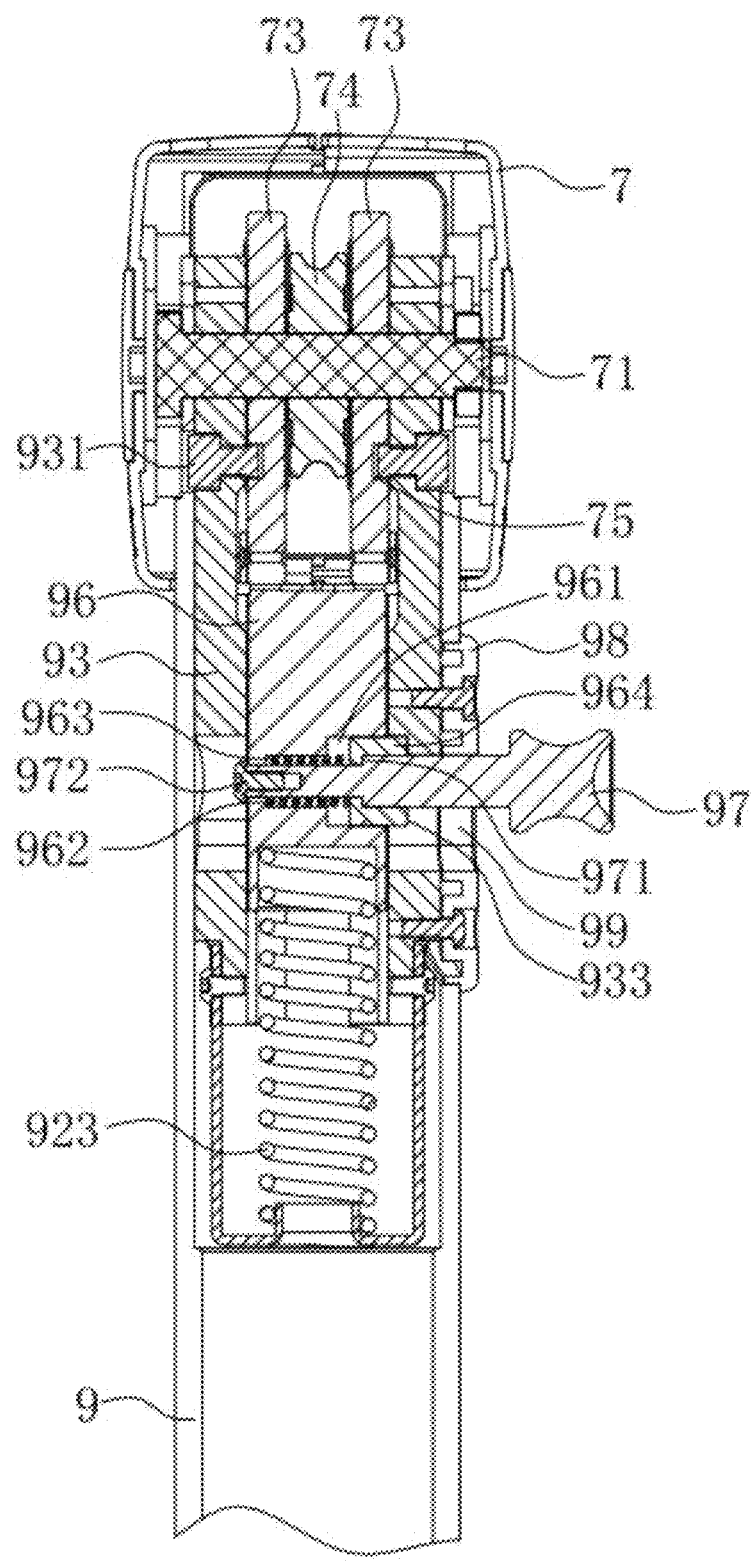
FIG. 25 is a cross-sectional view of a third type of vertical swing adjustment mechanism according to the present disclosure.
Figure 26:
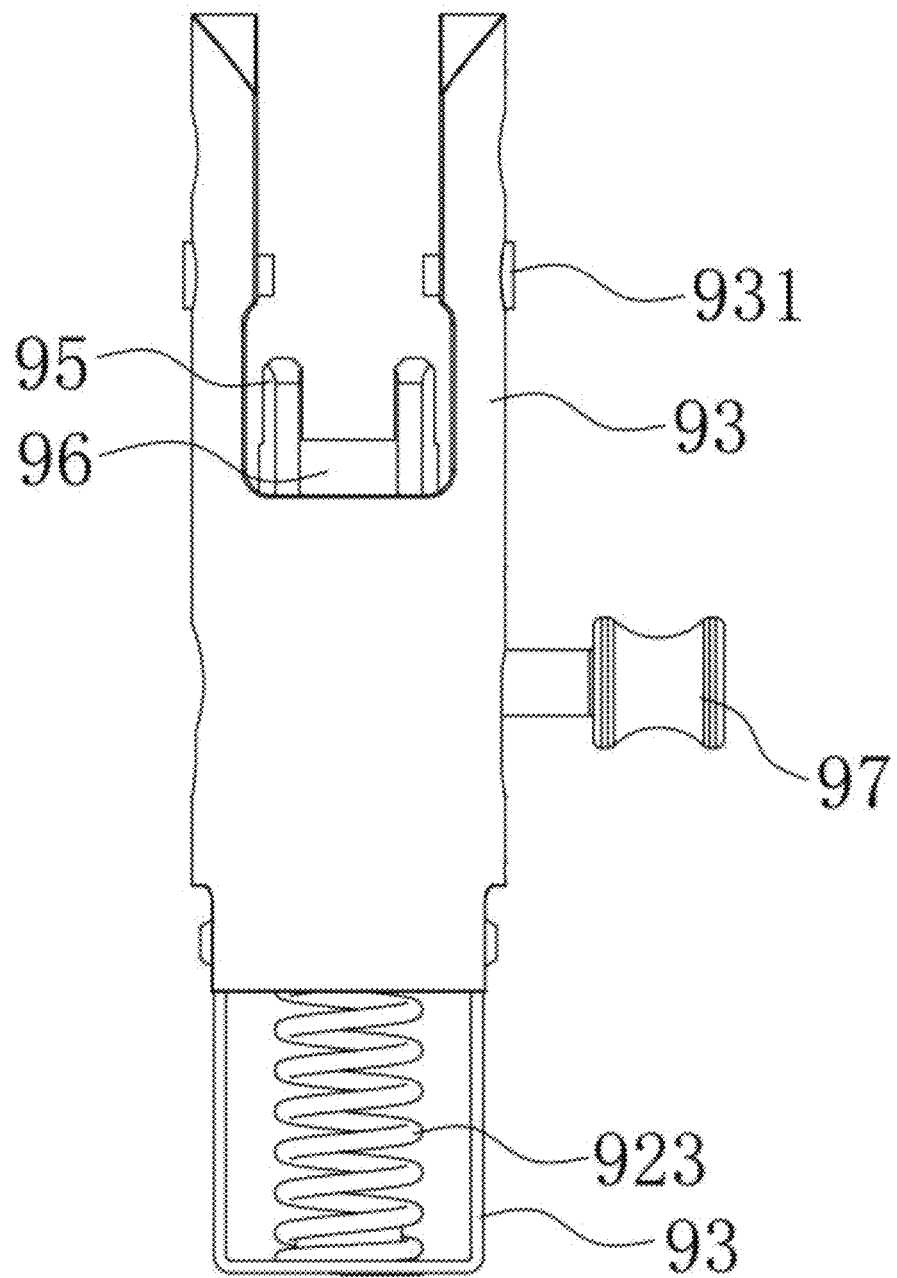
FIG. 26 is a schematic structural diagram of a moving seat and a connecting seat in a third type of vertical swing adjustment mechanism according to the present disclosure.
Figure 27:
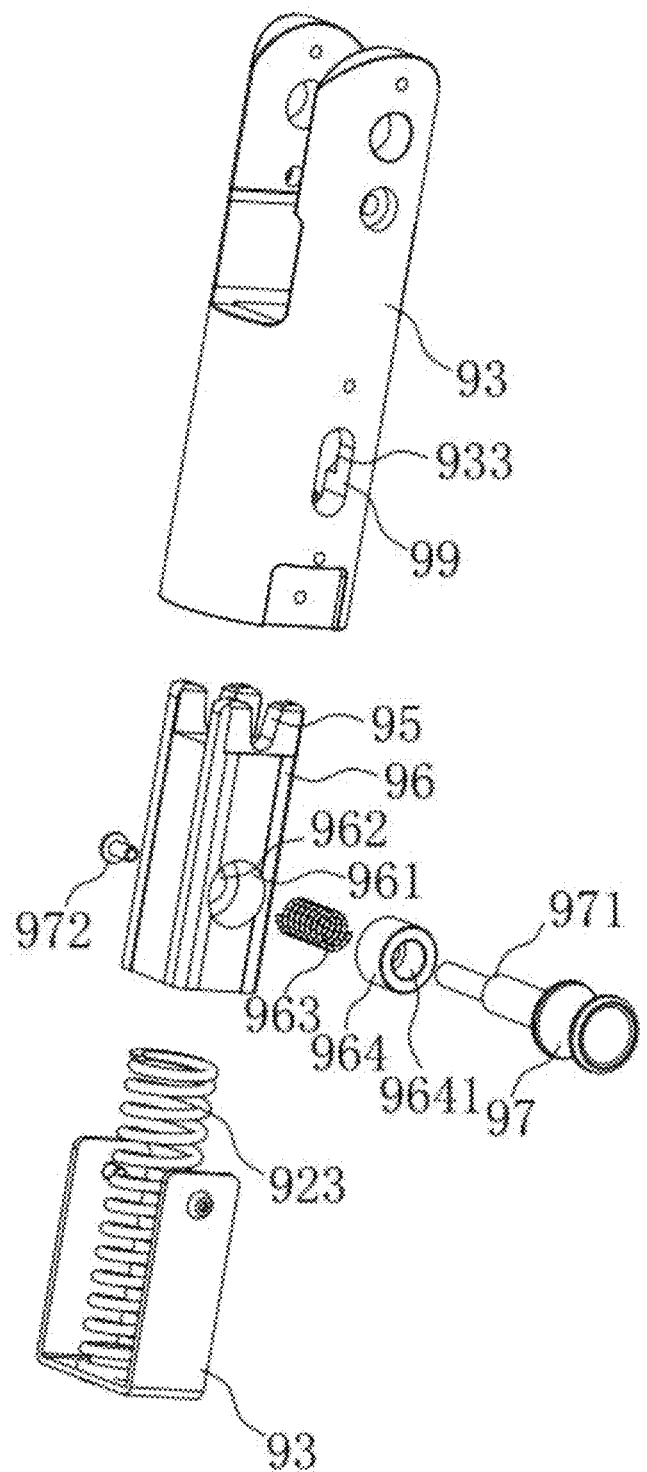
FIG. 27 is an exploded schematic diagram of a moving seat and a connecting seat in a third type of vertical swing adjustment mechanism according to the present disclosure.

For ease of installation, in the embodiment, a bearing groove 9641 is formed on the locking piece 964 facing the connecting seat 93. The inner end of the operating rod 97 passes through the bearing groove 9641, the receiving groove 962, and the moving seat 96, and is connected to a retaining screw 972. The middle part of the operating rod 97 radially protrudes to form a bearing step 971, and the bearing step 971 is located within the bearing groove 9641 and cooperates with the bottom surface of the bearing groove 9641 for synchronous movement. That is, during unlocking, the operating rod 97 moves inward, with the bearing step 971 acting on the bottom surface of the bearing groove 9641, thus causing the locking piece 964 to retract and press against the compression spring 963; during locking, the compression spring 963 acts on the locking piece 964, and the locking piece 964 acts on the bearing step 971 through the bottom surface of the bearing groove 9641, thereby resetting the operating rod 97. As shown in FIGS. 23 and 25, in the embodiment, a seat body 98 is further provided on the outer side of the arm 9 corresponding to the position of the operating rod 97. The seat body 98, the arm 9, and the connecting seat 93 are all provided with a movement slot 99 that allows the operating rod 97 to move toward or away from the hinge seat 7.

Furthermore, in the embodiment, arc-shaped guide slots 75 centered on the hinge are respectively formed on the back surfaces of the two lock plates 73; correspondingly, two guide posts 931 are symmetrically provided within the connecting seat 93. The guide posts 931 may be, but are not limited to, screws, and the guide posts 931 cooperate with the arc-shaped guide slots 75 to provide guidance and enhance stability when the arm 9 rotates.

From the above content, it is clear that the rotational folding positioning apparatus provided according to the embodiment can also achieve vertical swing of the arm 9, and the locking structure is more stable after vertical swing adjustment.

Embodiment V

Figure 2:
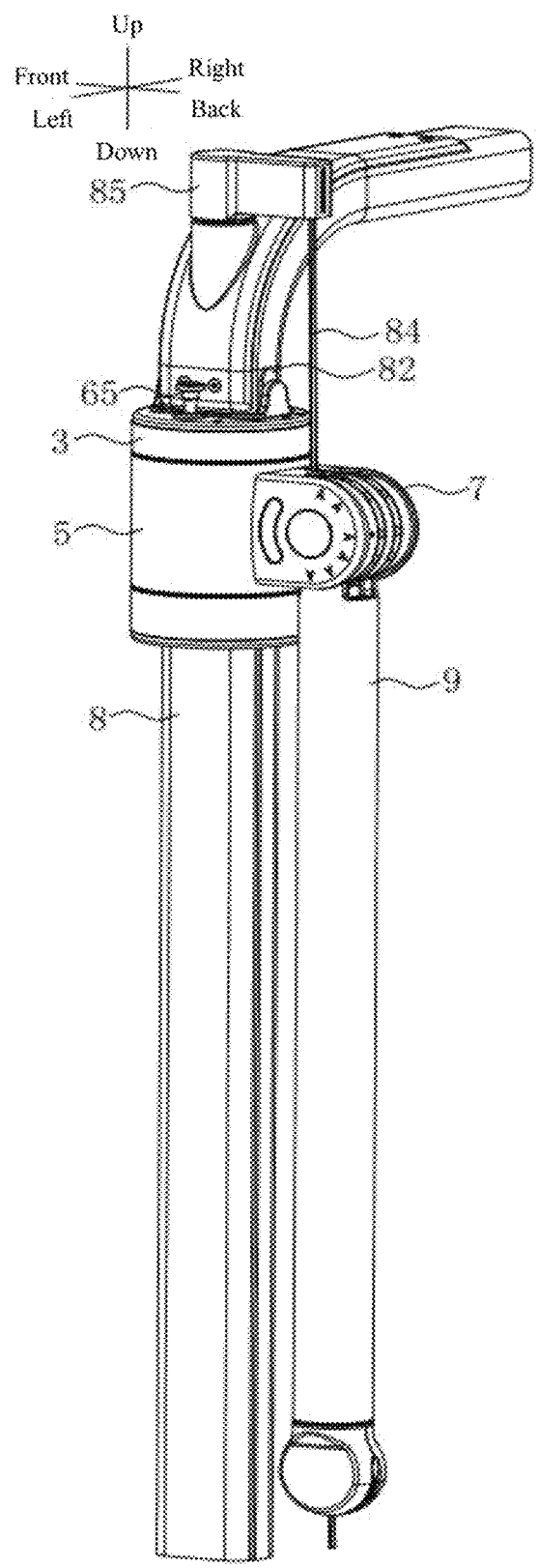
FIG. 2 is a schematic structural diagram of a rotational folding positioning apparatus from a second perspective according to the present disclosure.

The rotational folding positioning apparatus in the above embodiment may be applied to a fitness device. Specifically, this embodiment provides a multi-functional integrated fitness device. As shown in FIGS. 1 to 2, the fitness device includes at least one stand column 8, and each stand column 8 is provided with the rotational folding positioning apparatus described in the above embodiment to achieve the vertical height adjustment, horizontal rotation adjustment, and vertical swing adjustment of the arm 9. The stand column 8 and the rotational folding positioning apparatus/arm assembly are preferably two in number and symmetrically arranged. A user can pull rings (not shown in the figure) at the ends of each arm 9 for exercise. The arms 9 can be adjusted at multiple angles and in multiple directions, so the user can perform exercises involving various postures and functions, such as flyes, woodchops, and push-pull movements.

In the embodiment, a pull rope 84 is threaded through the arm 9. One end of the pull rope 84 is connected to the pull ring at the end of the arm 9, and the other end of the pull rope 84 passes through an intermediate pulley 74 on the hinge seat 7, then is led to a follower pulley 85 arranged at the top of the stand column 8, and then is led through the middle of the stand column 8 to a load such as a weight or a motor. The follower pulley 85 can adaptively rotate horizontally left and right during the horizontal rotation adjustment of the arm 9, thereby preventing the pull rope 84 from slipping off the sliding groove of the pulley and ensuring the stability and reliability of the pull rope 84 during movement.

The above description represents only the preferred implementation of the present disclosure. However, the protection scope of the present disclosure is not limited thereto. Equivalent replacements or changes made, within the technical scope disclosed by the present disclosure, by any of those familiar with the technical field according to the technical solutions and the inventive concepts of the present disclosure shall fall within the protection scope of the present disclosure.

What is claimed is:

1. A locking and positioning mechanism, comprising:
   a locking knob (1), wherein the locking knob (1) is in a threaded connection with a side wall of a support sleeve (3), and the support sleeve (3) sleeves a stand column (8); the locking knob (1) can be screwed in and out relative to the support sleeve (3), and when the locking knob (1) is screwed inward, an inner end of the locking knob (1) presses tightly against the stand column (8) for locking; and
   a positioning pin (2), wherein the positioning pin (2) is coaxially arranged through the locking knob (1), and the positioning pin (2) can extend inward and outward relative to the locking knob (1); an elastic member (22) is provided between the positioning pin (2) and the locking knob (1), and when the positioning pin (2) extends inward under an action of the elastic member (22), an inner end of the positioning pin (2) cooperates with a positioning hole (81) formed on the stand column (8) for positioning, wherein
   a protective pad (12) is further provided between the locking knob (1) and the stand column (8), and a via hole (15) is formed on the protective pad (12) for the inner end of the positioning pin (2) to pass through; the protective pad (12) comprises a flat pad part (121) and a connecting post (122), wherein the flat pad part (121) is compressed between the locking knob (1) and the stand column (8), the connecting post (122) is perpendicular to the flat pad part (121), the connecting post (122) is inserted into a connecting cavity (11) formed at the inner end of the locking knob (1), and an outer side wall of the connecting post (122) is flexibly connected to an inner side wall of the connecting cavity (11) by an O-ring (123);
   a plane bearing (13) further sleeves the connecting post (122) of the protective pad (12), and the plane bearing (13) is compressed between the flat pad part (121) of the protective pad (12) and the inner end of the locking knob (1);
   a threaded seat (31) is perpendicularly provided on a side wall of the support sleeve (3), and the locking knob (1) is in a threaded connection with the threaded seat (31); a retaining member (311) is further provided at an outer end of the threaded seat (31) to prevent the locking knob (1) from slipping out;
   a flange (21) is formed in a middle part of the positioning pin (2), the flange (21) is confined to move within the connecting cavity (11), and the elastic member (22) is arranged between the flange (21) and a bottom surface of the connecting cavity (11); one end of the positioning pin (2) passes inward through the support sleeve (3), and the other end extends outward from the locking knob (1) to form an operating part; pressing plates (14) are further arranged oppositely on both sides of the stand column (8), with one of the pressing plates (14) being arranged between the stand column (8) and the protective pad (12), and a via hole (15) being formed on the pressing plate (14) for the positioning pin (2) to pass through;
   the locking and positioning mechanism is configured for a rotational folding positioning apparatus, wherein the stand column (8) is a square tube, the locking knob (1) and the positioning pin (2) are arranged on a right side of the stand column (8), and a plurality of the positioning holes (81) are vertically formed on a right side surface of the stand column (8); protective strips (82) are respectively provided vertically on a front side surface and a rear side surface of the stand column (8), and rollers (4) are provided correspondingly on the support sleeve (3); a rotational sleeve (5) further sleeves the support sleeve (3), the rotational sleeve (5) is connected to an arm (9), and the rotational sleeve (5) drives the arm (9) to rotate horizontally relative to the support sleeve (3); a horizontal rotation adjustment mechanism that adjusts a horizontal rotation angle of the arm (9) is provided on a left side of the stand column (8);
   a vertical swing adjustment mechanism is further provided between the arm (9) and the rotational sleeve (5); the rotational sleeve (5) is provided with a hinge seat (7), and the arm (9) is hinged to the hinge seat (7); a plurality of locking grooves (72), arranged circumferentially and centered on a hinge shaft (71), are further formed on the hinge seat (7); a locking member (91) is provided on the arm (9), and the locking member (91) extends and retracts along a direction parallel to the hinge shaft (71) to cooperate with the locking grooves (72) for locking; a fixed seat (92) is provided within the arm (9), and a through hole (921) is formed on the fixed seat (92) for the locking member (91) to extend and retract; a lock cylinder (922) is provided within the fixed seat (92), and a recessed part (9221) is formed on the lock cylinder (922); the lock cylinder (922) slides along a length direction of the arm (9); when the lock cylinder (922) slides towards the hinge shaft (71), the recessed part (9221) is offset from the through hole (921) and forces the locking member (91) to simultaneously extend into the through hole (921) and the locking groove (72) for locking; when the lock cylinder (922) slides away from the hinge shaft (71), the recessed part (9221) aligns with the through hole (921), allowing the locking member (91) to disengage from the locking groove (72), thus releasing the lock;
   or, a vertical swing adjustment mechanism is further provided between the arm (9) and the rotational sleeve (5); the rotational sleeve (5) is provided with a hinge seat (7), and the arm (9) is hinged to the hinge seat (7); a plurality of lock teeth (76), arranged circumferentially and centered on a hinge shaft (71), are further formed on the hinge seat (7); a moving seat (96) is provided within the arm (9), and the moving seat (96) slides towards or away from the hinge shaft (71); a lock groove (95) is formed on one end, towards the hinge shaft (71), of the moving seat (96), and the moving seat (96) causes the lock groove (95) to engage with one of the lock teeth (76) under an action of a compressed spring; the moving seat (96) is further provided with a locking piece (964) that elastically extends and retracts perpendicularly to a sliding direction of the moving seat (96); a locking slot (933) is correspondingly formed on the arm (9), and the locking piece (964), when extending into the locking slot (933), locks the moving seat (96) and the arm (9).

2. A rotational folding positioning apparatus, comprising the locking and positioning mechanism according to claim 1, wherein the horizontal rotation adjustment mechanism comprises a clamping block (6), and the clamping block (6) is vertically and elastically arranged on the support sleeve (3); a protruding edge (51) is inwardly formed at an end of the rotational sleeve (5), and a plurality of clamping slots (511) are formed on the protruding edge (51); after a lateral adjustment of the rotational sleeve (5) is completed, the clamping block (6) engages with a currently corresponding clamping slot (511) to limit the rotational sleeve (5) from horizontal rotation.

\* \* \* \* \*